United States Patent
Khan et al.

(10) Patent No.: US 12,526,844 B2
(45) Date of Patent: Jan. 13, 2026

(54) PRACH CONFIGURATION FOR NR OVER NTN

(71) Applicant: Telefonaktiebolaget LM Ericsson (publ), Stockholm (SE)

(72) Inventors: Talha Khan, Santa Clara, CA (US); Xingqin Lin, Santa Jose, CA (US); Zhipeng Lin, Suzhou (CN)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 439 days.

(21) Appl. No.: 18/004,737

(22) PCT Filed: Jul. 22, 2021

(86) PCT No.: PCT/SE2021/050745
§ 371 (c)(1),
(2) Date: Jan. 9, 2023

(87) PCT Pub. No.: WO2022/019823
PCT Pub. Date: Jan. 27, 2022

(65) Prior Publication Data
US 2023/0254900 A1 Aug. 10, 2023

Related U.S. Application Data

(60) Provisional application No. 63/055,101, filed on Jul. 22, 2020.

(51) Int. Cl.
*H04W 74/0833* (2024.01)
*H04W 74/08* (2009.01)
(Continued)

(52) U.S. Cl.
CPC ... *H04W 74/0833* (2013.01); *H04W 74/0866* (2013.01); *H04W 74/0836* (2024.01); *H04W 74/0838* (2024.01); *H04W 84/06* (2013.01)

(58) Field of Classification Search
None
See application file for complete search history.

(56) References Cited

U.S. PATENT DOCUMENTS

2020/0154377 A1* 5/2020 Qian ................. H04W 72/0453
2020/0214044 A1* 7/2020 Qian ................. H04W 52/146
(Continued)

FOREIGN PATENT DOCUMENTS

EP 3530056 B1 8/2019
EP 3764715 A1 1/2021
(Continued)

OTHER PUBLICATIONS

International Search Report and Written Opinion dated Oct. 13, 2021 for International Application No. PCT/SE2021/050745 filed Jul. 22, 2021, consisting of 13-pages.
(Continued)

*Primary Examiner* — Faiyazkhan Ghafoerkhan
(74) *Attorney, Agent, or Firm* — Weisberg I.P. Law, P.A.

(57) ABSTRACT

Systems and methods of the present disclosure are directed to Physical Random Access Channel (PRACH) over NTN (Non-Terrestrial-Networks). For example, a method performed by a wireless communication device for random access includes determining one or more random access occasions for transmission of a random access channel. The method includes transmitting the random access channel on the determined one or more random access occasions.

14 Claims, 28 Drawing Sheets

---

RECEIVE PRACH PARAMETER (E.G., prach-ConfigurationIndex) USED FOR BOTH NORMAL RA AND NTN-SPECIFIC RA
1900

↓

DETERMINE PRACH OCCASIONS BASED ON THE PRACH PARAMETER AND A NTN-SPECIFIC PRACH CONFIGURATION TABLE
1902

(51) Int. Cl.
    *H04W 74/0836*    (2024.01)
    *H04W 74/0838*    (2024.01)
    *H04W 84/06*      (2009.01)

(56)              References Cited

U.S. PATENT DOCUMENTS

| | | | |
|---|---|---|---|
| 2020/0221506 A1* | 7/2020 | Jeon | H04W 74/0808 |
| 2020/0267764 A1* | 8/2020 | Rastegardoost | H04W 74/006 |
| 2020/0314917 A1* | 10/2020 | Jeon | H04W 74/0833 |
| 2020/0351801 A1* | 11/2020 | Jeon | H04W 52/48 |
| 2020/0351955 A1* | 11/2020 | Jeon | H04L 1/1642 |
| 2021/0051672 A1* | 2/2021 | Rastegardoost | H04W 72/21 |
| 2021/0051736 A1* | 2/2021 | Jeon | H04W 76/11 |
| 2021/0144742 A1* | 5/2021 | Jeon | H04W 74/0833 |
| 2021/0378025 A1* | 12/2021 | Lin | H04W 74/0866 |
| 2022/0061092 A1* | 2/2022 | Rastegardoost | H04W 74/0808 |
| 2022/0078856 A1* | 3/2022 | Jeon | H04L 1/1671 |
| 2022/0110184 A1* | 4/2022 | Jeon | H04W 74/0833 |
| 2022/0159634 A1* | 5/2022 | Rastegardoost | H04W 72/23 |
| 2022/0201773 A1* | 6/2022 | Jeon | H04W 74/0858 |
| 2022/0338266 A1* | 10/2022 | Jeon | H04W 74/0833 |
| 2022/0377814 A1* | 11/2022 | Jeon | H04W 74/0841 |
| 2023/0085104 A1* | 3/2023 | Park | H04L 1/18 370/329 |
| 2023/0254900 A1* | 8/2023 | Khan | H04W 74/004 370/329 |

FOREIGN PATENT DOCUMENTS

| | | |
|---|---|---|
| WO | 2017030485 A1 | 2/2017 |
| WO | 2020126892 A1 | 6/2020 |
| WO | 2020169074 A1 | 8/2020 |
| WO | 2021090261 A1 | 5/2021 |

OTHER PUBLICATIONS

3GPP TR 38.811 V15.3.0; 3rd Generation Partnership Project; Technical Specification Group Radio Access Network; Study on New Radio (NR) to support non-terrestrial networks (Release 15); Jul. 2020, consisting of 126-pages.

3GPP TR 38.821 V16.0.0; 3rd Generation Partnership Project; Technical Specification Group Radio Access Network; Solutions for NR to support non-terrestrial networks (NTN) (Release 16); Dec. 2019, consisting of 140-pages.

3GPP TS 38.213 V16.2.0; 3rd Generation Partnership Project; Technical Specification Group Radio Access Network; NR; Physical layer procedures for control (Release 16); Jun. 2020, consisting of 176-pages.

3GPP TS 38.211 V16.2.0; 3rd Generation Partnership Project; Technical Specification Group Radio Access Network; NR; Physical channels and modulation (Release 16); Jun. 2020, consisting of 131-pages.

3GPP TSG RAN meeting #86 RP-193234 revision from RP-192502, 3144; Title: Solutions for NR to support non-terrestrial networks (NTN); Agenda Item: 9.1.2-Proposals led by RAN2; Source: Thales; Type: WID new Release: Rel-17; Document for: Approval; Date and Location: Dec. 9-13, 2019, Sitges, Spain, consisting of 10-pages.

3GPP TSG RAN meeting #86 RP-193235 (revision of xx-yyxxxx); Title: new Study WID on NB-IoT/eTMC support for NTN; Agenda Item: xxx; Source: MediaTek, Inc.; Document for: Approval; Date and Location: Dec. 9-13, 2019, Sitges, Spain, consisting of 4-pages.

X. Lin et al.; 5G New Radio Evolution Meets Satellite Communications: Opportunities, Challenges, and Solutions; arXiv; arXiv:1903.11219v1 [cs.NI]; Mar. 27, 2019, consisting of 8-pages.

* cited by examiner

CFRA with 4-step RA type (left) and 2-step RA type (right)

PRACH CONFIGURATION FOR NR OVER NTN

CROSS-REFERENCE TO RELATED APPLICATIONS

This application is a Submission Under 35 U.S.C. § 371 for U.S. National Stage Patent Application of International Application No.: PCT/SE2021/050745, filed Jul. 22, 2021 entitled "PRACH CONFIGURATION FOR NR OVER NTN," which claims priority to U.S. Provisional Application No. 63/055,101, filed Jul. 22, 2020, entitled "PRACH CONFIGURATION FOR NR OVER NTN," the entireties of both of which are incorporated herein by reference.

TECHNICAL FIELD

Generally, the present disclosure is directed to Physical Random Access Channel (PRACH) configuration for New Radio (NR) over Non-Terrestrial Networks (NTN).

BACKGROUND

Recent and Future Developments in the Third Generation Partnership Project (3GPP)

In Third Generation Partnership Project (3GPP) Release 8, the Evolved Packet System (EPS) was specified. EPS is based on the Long-Term Evolution (LTE) radio network and the Evolved Packet Core (EPC). The EPS was originally intended to provide voice and Mobile Broadband (MBB) services but has continuously evolved to broaden its functionality. Since Release 13, Narrowband Internet of Things (NB-IoT) and LTE for Machine Type Communication (LTE-M) are part of the LTE specifications and provide connectivity to massive Machine Type Communications (mMTC) services.

In 3GPP Release 15, the first release of the Fifth Generation (5G) system (5GS) was specified. This is a new generation's radio access technology intended to serve use cases such as enhanced Mobile Broadband (eMBB), Ultra-reliable and Low Latency Communication (URLLC), and mMTC. 5G includes the New Radio (NR) access stratum interface and the 5G Core Network (5GC). The NR physical and higher layers are reusing parts of the LTE specification, and to that add needed components when motivated by new use cases. One such component is the introduction of a sophisticated framework for beam forming and beam management to extend the support of the 3GPP technologies to a frequency range going beyond 6 Gigahertz (GHz).

In Release 15, 3GPP started the work to prepare NR for operation in a Non-Terrestrial Network (NTN). The work was performed within the study item "NR to support Non-Terrestrial Networks" and resulted in 3GPP Technical Report (TR) 38.811 (hereinafter referred to as reference [1]). In Release 16, the work to prepare NR for operation in an NTN network continued with the study item "Solutions for NR to support Non-Terrestrial Network" (see 3GPP TR 38.821, hereinafter referred to as reference [2]). In parallel, the interest to adapt NB-IoT and LTE-M for operation in NTN is growing. As a consequence, 3GPP Release 17 contains both a work item on NR NTN (see RP-193234, Solutions for NR to support non-terrestrial networks (NTN), 3GPP RAN #86, hereinafter referred to as reference [3]) and a study item on NB-IoT and LTE-M support for NTN (see RP-193235, Study on NB-Io/eMTC support for Non-Terrestrial Network, 3GPP RAN #86, hereinafter referred to as reference [4])).

Satellite Communications in Non-Terrestrial Networks (NTN)

A satellite radio access network usually includes the following components:
  A satellite that refers to a space-borne platform.
  An earth-based gateway that connects the satellite to a base station or a core network, depending on the choice of architecture.
  Feeder link that refers to the link between a gateway and a satellite.
  Access link that refers to the link between a satellite and a User Equipment (UE).
Depending on the orbit altitude, a satellite may be categorized as Low Earth Orbit (LEO), Medium Earth Orbit (MEO), or Geostationary Earth Orbit (GEO) satellite:
  LEO: typical heights ranging from 250-1,500 kilometers (km), with orbital periods ranging from 90-120 minutes.
  MEO: typical heights ranging from 5,000-25,000 km, with orbital periods ranging from 3-15 hours.
  GEO: height at about 35,786 km, with an orbital period of 24 hours.

A communication satellite typically generates several beams over a given area. The footprint of a beam is usually in an elliptic shape, which has been traditionally considered as a cell. The footprint of a beam is also often referred to as a spotbeam. The footprint of a beam may move over the earth surface with the satellite movement or may be earth-fixed with some beam pointing mechanism used by the satellite to compensate for its motion. The size of a spotbeam depends on the system design, which may range from tens of kilometers to a few thousands of kilometers.

FIG. 1 depicts an example architecture of a satellite network with bent pipe transponders. The depicted elevation angle of the service link is important as it impacts the distance between the satellite and the device, and the velocity of the satellite relative to the device. In 3GPP, it has been assumed that the service link is operational for elevation angles exceeding a threshold of 10 degrees. Different locations within a cell will observe different elevation angles at a given time. From the network perspective, the elevation angle is often referred relative to a reference point such as the spot beam center.

In an earth-fixed beam LEO or MEO NTN providing continuous coverage, a UE will be served by the same beam as long as the UE is in the coverage area of the satellite. Handover to a new satellite fulfilling the elevation angle threshold needs to be performed when the elevation angle to the currently serving satellite approaches the elevation angle threshold. The handover rate may be frequent, and it is shown in FIG. 2 of Lin et al. "5G New Radio Evolution Meets Satellite Communications: Opportunities, Challenges, and Solution," arXiv preprint arXiv:1903.11219, March 2019. Available at https://arxiv.org/pdf/1903.11219 (hereinafter referred to as reference [5]) (demonstrating that an inter-satellite handover may be required every 450 seconds for a LEO constellation at 600 km altitude).

For LEO or MEO constellations using earth moving beams, the UE will be served by the beam that currently passes the UE location. The UE will sequentially be served by a series of beams of the same satellite as the coverage area of the satellite passes the UE. After that, the UE will be served by a series of beams of a different satellite, etc. Thus, switching between satellite beams is even more frequent. In reference [5], it is shown that for a LEO constellation at 600 km altitude based on earth moving beams a handover between spotbeams may be required every 10 seconds.

Unlike the situation in terrestrial networks, the service link in NTN is typically Line-of-Sight (LoS), and therefore the pathloss is mainly dependent on the satellite-UE distance. Due to the geometry, the pathloss does not differ dramatically between the different beams of a satellite. E.g., a pathloss range in the order of 10 decibels (dB) can be expected within the coverage area of a LEO satellite at 600 km altitude. The spotbeam selectivity is mainly due to the directivity of the antenna lobes. The antenna lobes are approximately symmetric around each beam's center point on earth. It may therefore be feasible that cell selection/reselection is based on which spotbeam center that is closest to the UE. The UE can calculate its distance to each beam center and perform distance-based cell selection/reselection using information of ephemeris and beam constellation of nearby NTN satellites together with UE location.

NR Cell Search and System Information Acquisition

In NR, the combination of Synchronization Signals (SS) and Physical Broadcast Channel (PBCH) is referred to as a SS/PBCH block (SSB). Similar to LTE, a pair of SS, Primary Synchronization Signal (PSS) and Secondary Synchronization Signal (SSS), is periodically transmitted on downlink from each cell to allow a UE to initially access to the network. By detecting SS, a UE can obtain the physical cell identity, achieve downlink synchronization in both time and frequency, and acquire the timing for PBCH. PBCH carries the Master Information Block (MIB), which contains a minimum system information that a UE needs to acquire System Information Block 1 (SIB1). SIB1 carries the remaining minimum system information that is needed for a UE to be able to perform subsequent random-access procedure.

NR Random Access Procedure

Two types of Random Access (RA) procedure are supported: 4-step RA type with Msg1 and 2-step RA type with a message (MsgA) MSGA. Both types of RA procedure support Contention-Based Random Access (CBRA) and Contention-Free Random Access (CFRA).

The 4-step contention based random access produce, also referred to as Type-1 random access procedure in 3GPP TS 38.213 (see, e.g., V16.2.0), is illustrated in FIG. 2. In the first step, a UE initiates the random-access procedure by transmitting in uplink (UL) a random-access preamble (Msg1) on a Physical Random-Access Channel (PRACH). After detecting the Msg1, the NR base station (referred to as a gNB) will respond by transmitting in downlink (DL) a Random-Access Response (RAR) on a Physical Downlink Shared Channel (PDSCH) (Msg2). In the third step, after successfully decoding Msg2, the UE continues the procedure by transmitting in UL a Physical Uplink Shared Channel (PUSCH) (Msg3) for terminal identification and Radio Resource Control (RRC) connection establishment request. In the last step of the procedure, the gNB transmits in DL a PDSCH (Msg4) for contention resolution.

There can be cases that multiple UEs select the same random-access preamble and transmit the preamble on the same PRACH time/frequency resource. This preamble collision is called contention. One of the main purposes of applying Step 3 and Step 4 is to resolve such potential contention.

The 2-step random access produce, also referred to as Type-2 random access procedure in 3GPP TS 38.213, is illustrated in FIG. 3. In the first step, a UE sends a message A including random access preamble together with higher layer data such as RRC connection request possibly with some small payload on PUSCH.

After detecting the MsgA, the network sends RAR (called message B) including UE identifier assignment, timing advance information, and contention resolution message, etc.

A CFRA procedure is illustrated in FIG. 4, where the network assigns a preamble for CFRA in 4-step Random Access Channel (RACH) or a preamble and PUSCH for CFRA in 2-step RACH, and it does not configure CFRA resources for 4-step and 2-step RA types at the same time for a Bandwidth Part (BWP). And CFRA with 2-step RA type is only supported for handover.

The Msg1 of 4-step includes only a preamble on PRACH, while the MSGA of the 2-step RA type includes a preamble on PRACH and a payload on PUSCH. After Msg1 transmission or MSGA transmission, UE monitors for a response from the network within a configured window. For CFRA, upon receiving the network response, the UE ends the random access procedure.

NR Rel-15 PRACH Configuration

In NR, the time and frequency resource on which a random-access preamble (Msg1) is transmitted is defined as a PRACH occasion.

The time resources and preamble format for the Msg1 transmission are configured by a PRACH configuration index, which indicates a row in a PRACH configuration table specified in 3GPP TS 38.211 (see, e.g., V16.2.0) Tables 6.3.3.2-2, 6.3.3.2-3, 6.3.3.2-4 for frequency range 1 (FR1) with paired spectrum, FR1 with unpaired spectrum, and frequency range 2 (FR2) with unpaired spectrum, respectively.

Part of the Table 6.3.3.2-3 for FR1 with unpaired spectrum for preamble format 0 is copied in Table 1 below, where the value of x indicates the PRACH configuration period in number of system frames. The value of y indicates the system frame within each PRACH configuration period on which the PRACH occasions are configured. For instance, if y is set to 0, then, it means PRACH occasions are only configured in the first frame of each PRACH configuration period. The values in the column "subframe number" tells on which subframes are configured with PRACH occasion. The values in the column "starting symbol" is the symbol index.

In case of Time Division Duplexing (TDD), semi-statically configured DL parts and/or actually transmitted SSBs can override and invalidate some time-domain PRACH occasions defined in the PRACH configuration table. More specifically, PRACH occasions in the UL part are always valid, and a PRACH occasion within the flexible part is valid as long as it does not precede or collide with an SSB in the RACH slot and it is at least N symbols after the DL part and the last symbol of an SSB. N is 0 or 2 depending on PRACH format and subcarrier spacing.

TABLE 1

PRACH configuration for preamble format 0 for FR1 unpaired spectrum

| PRACH Configuration Index | Preamble format | $n_{SFN}$ mod x = y | | Subframe number | Starting symbol | Number of PRACH slots within a subframe | $N_t^{RA, slot}$, number of time-domain PRACH occasions within a PRACH slot | $N_{dur}^{RA}$, PRACH duration |
|---|---|---|---|---|---|---|---|---|
| | | x | y | | | | | |
| 0 | 0 | 16 | 1 | 9 | 0 | — | — | 0 |
| 1 | 0 | 8 | 1 | 9 | 0 | — | — | 0 |
| 2 | 0 | 4 | 1 | 9 | 0 | — | — | 0 |
| 3 | 0 | 2 | 0 | 9 | 0 | — | — | 0 |
| 4 | 0 | 2 | 1 | 9 | 0 | — | — | 0 |
| 5 | 0 | 2 | 0 | 4 | 0 | — | — | 0 |
| 6 | 0 | 2 | 1 | 4 | 0 | — | — | 0 |
| 7 | 0 | 1 | 0 | 9 | 0 | — | — | 0 |
| 8 | 0 | 1 | 0 | 8 | 0 | — | — | 0 |
| 9 | 0 | 1 | 0 | 7 | 0 | — | — | 0 |
| 10 | 0 | 1 | 0 | 6 | 0 | — | — | 0 |
| 11 | 0 | 1 | 0 | 5 | 0 | — | — | 0 |
| 12 | 0 | 1 | 0 | 4 | 0 | — | — | 0 |
| 13 | 0 | 1 | 0 | 3 | 0 | — | — | 0 |
| 14 | 0 | 1 | 0 | 2 | 0 | — | — | 0 |
| 15 | 0 | 1 | 0 | 1, 6 | 0 | — | — | 0 |
| 16 | 0 | 1 | 0 | 1, 6 | 7 | — | — | 0 |
| 17 | 0 | 1 | 0 | 4, 9 | 0 | — | — | 0 |
| 18 | 0 | 1 | 0 | 3, 8 | 0 | — | — | 0 |
| 19 | 0 | 1 | 0 | 2, 7 | 0 | — | — | 0 |
| 20 | 0 | 1 | 0 | 8, 9 | 0 | — | — | 0 |
| 21 | 0 | 1 | 0 | 4, 8, 9 | 0 | — | — | 0 |
| 22 | 0 | 1 | 0 | 3, 4, 9 | 0 | — | — | 0 |
| 23 | 0 | 1 | 0 | 7, 8, 9 | 0 | — | — | 0 |
| 24 | 0 | 1 | 0 | 3, 4, 8, 9 | 0 | — | — | 0 |
| 25 | 0 | 1 | 0 | 6, 7, 8, 9 | 0 | — | — | 0 |
| 26 | 0 | 1 | 0 | 1, 4, 6, 9 | 0 | — | — | 0 |
| 27 | 0 | 1 | 0 | 1, 3, 5, 7, 9 | 0 | — | — | 0 |

In the frequency domain, NR supports multiple frequency-multiplexed PRACH occasions on the same time-domain PRACH occasion. This is mainly motivated by the support of analog beam sweeping in NR such that the PRACH occasions associated to one SSB are configured at the same time instance but different frequency locations. The starting position in the frequency is indicated by the higher-layer parameter msg1-FrequencyStart in SIB1, and the number of consecutive PRACH occasions Frequency Multiplexed (FDM) ed in one time instance is configured by the higher-layer parameter msg1-FDM in SIB1. The number of PRACH occasions FDMed in one time domain PRACH occasion can be 1, 2, 4, or 8.

FIG. 5 gives an example of the PRACH occasion configuration in NR.

In NR Rel-15, there are up to 64 sequences that can be used as random-access preambles per PRACH occasion in each cell. The RRC parameter totalNumberOfRA-Preambles determines how many of these 64 sequences are used as random-access preambles per PRACH occasion in each cell. The 64 sequences are configured by including firstly all the available cyclic shifts of a root Zadoff-Chu (ZC) sequence, and secondly in the order of increasing root index, until 64 preambles have been generated for the PRACH occasion.

NR Rel-15 Association Between SSB and PRACH Occasion

NR Rel-15 supports one-to-one, one-to-many, and many-to-one association between SSB and PRACH Occasions, as illustrated in FIG. 6 (example of one SSB per PRACH occasion) and FIG. 7 (example with two SSBs per PRACH occasion).

The preambles associated to each SSB are configured by the two RRC parameters in the RACH-ConfigCommon: ssb-perRACH-OccasionAndCB-PreamblesPerSSB and totalNumberOfRA-Preambles.

The detailed mapping rule is specified in TS 38.213 section 8.1, as following:

For Type-1 random access procedure, a UE is provided a number N of SS/PBCH blocks associated with one PRACH occasion and a number R of contention based preambles per SS/PBCH block per valid PRACH occasion by ssb-perRACH-OccasionAndCB-PreamblesPerSSB.
A UE is provided a number N of SS/PBCH blocks associated with one PRACH occasion and a number R of contention-based preambles per SS/PBCH block per valid PRACH occasion by ssb-perRACH-OccasionAndCB-PreamblesPerSSB. If N < 1, one SS/PBCH block is mapped to 1/N consecutive valid PRACH occasions and R contention based preambles with consecutive indexes associated with the SS/PBCH block per valid PRACH occasion start from preamble index 0. If N ≥ 1, R contention based preambles with consecutive indexes associated with SS/PBCH block n, $0 \leq n \leq N - 1$, per valid PRACH occasion start from preamble index $n \cdot N_{preamble}^{total}/N$ where $N_{preamble}^{total}$ is provided by totalNumberOfRA-Preambles and is an integer multiple of N.

SS/PBCH block indexes provided by ssb-PositionsInBurst in SIB1 or in ServingCellConfigCommon are mapped to valid PRACH occasions in the following order where the parameters are described in [4, TS 38.211].
First, in increasing order of preamble indexes within a single PRACH occasion
Second, in increasing order of frequency resource indexes for frequency multiplexed PRACH occasions
Third, in increasing order of time resource indexes for time multiplexed PRACH occasions within a PRACH slot
Fourth, in increasing order of indexes for PRACH slots FIG. 8 depicts an example of the mapping between SSBs and random-access preambles in different PRACH occasions.

For each SSB, the associated preambles per PRACH occasion, $N_{preamble}^{total}/N$, are further divided into two sets for CBRA and CFRA. The number of Code Block (CB) preambles per SSB per PRACH occasion, R, is signaled by the RRC parameter ssb-perRACH-OccasionAndCB-PreamblesPerSSB. Preamble indices for CBRA and CFRA are mapped consecutively for one SSB in one PRACH occasion, as shown in FIG. 9. If Random Access Preambles group B is configured for CBRA, then, amongst the CBRA preambles (#CB-preambles-per-SSB) associated with an SSB, the first numberOfRA-PreamblesGroupA Random Access Preambles belong to Random Access Preambles group A, and the remaining Random Access Preambles associated with the SSB belong to Random Access Preambles group B. FIG. 10 shows an example, when Random Access Preambles group B is configured for CBRA.

According to 3GPP TS 38.213, one of the two conditions must be met in order for a UE to select Random Access Preambles group B for PRACH transmission:

Condition 1: potential Msg3 size (UL data available for transmission plus Medium Access Control (MAC) header and, where required, MAC Control Elements (CEs)) is greater than ra-Msg3SizeGroupA and the pathloss is less than a maximum power (PCMAX) (e.g., of the Serving Cell performing the Random Access Procedure)-preambleReceivedTargetPower-msg3-DeltaPreamble-messagePowerOffsetGroupB, or Condition 2: the Random Access procedure was initiated for a Common Control Channel (CCCH) logical channel and the CCCH Service Data Unit (SDU) size plus MAC subheader is greater than ra-Msg3SizeGroupA.

NR Rel-16 for MsgA Configuration: MsgA Preamble Configuration

The RACH occasions for 2-step RACH can be either separately configured (also known as Type-2 random access procedure with separate configuration of PRACH occasions with Type-1 random access procedure) or are shared with 4-step RACH (also known as Type-2 random access procedure with common configuration of PRACH occasions with Type-1 random access procedure) in which case different sets of preamble identifiers (IDs) will be used.

For Type-2 random access procedure with common configuration of PRACH occasions with Type-1 random access procedure, a UE is provided a number N of SS/PBCH blocks associated with one PRACH occasion by ssb-perRACH-OccasionAndCB-PreamblesPerSSB and a number Q of contention based preambles per SS/PBCH block per valid PRACH occasion by msgA-CB-PreamblesPerSSB. The PRACH transmission can be on a subset of PRACH occasions associated with a same SS/PBCH block index for a UE provided with a PRACH mask index by msgA-ssb-sharedRO-MaskIndex. An example of the SSB to Random Access Channel Occasion (RO) mapping and the preamble allocation when ROs for 2-step RACH and 4-step RACH are shared is provided in FIG. 11. Note that only one preamble group is assumed in this example.

For Type-2 random access procedure with separate configuration of PRACH occasions from Type-1 random access procedure, a UE is provided a number N of SS/PBCH blocks associated with one PRACH occasion and a number R of contention based preambles per SS/PBCH block per valid PRACH occasion by ssb-perRACH-OccasionAndCB-PreamblesPerSSB-msgA when provided; otherwise, by ssb-perRACH-OccasionAndCB-PreamblesPerSSB. Since the SSB to RO mapping and the preamble allocation are independently configured, the example provided for 4-step RACH in FIG. 10 is also valid for this case of 2-step RACH except that the parameters are separately configured for 2-step RACH.

NR Rel-16 for MsgA Configuration

MsgA PUSCH Configuration

A PUSCH occasion is defined as the time frequency resource used for one PUSCH transmission. For one msgA PUSCH occasion, one or more Demodulation Reference Symbol (DMRS) resources can be configured, one of which will be selected for each PUSCH transmission within the PUSCH occasion.

A set of PUSCH occasions are configured per MsgA PUSCH configuration which are relative to and mapped by a group of preambles in a set of ROs in one PRACH slot. A mapping between one or multiple PRACH preambles and a PUSCH occasion associated with a DMRS resource is according to the mapping order as described below.

Each consecutive number of $N_{preamble}$ preamble indexes from valid PRACH occasions in a PRACH slot first, in increasing order of preamble indexes within a single PRACH occasion second, in increasing order of frequency resource indexes for frequency multiplexed PRACH occasions third, in increasing order of time resource indexes for time multiplexed PRACH occasions within a PRACH slot are mapped to a valid PUSCH occasion and the associated DMRS resource first, in increasing order of frequency resource indexes $f_{id}$ for frequency multiplexed PUSCH occasions second, in increasing order of DMRS resource indexes within a PUSCH occasion, where a DMRS resource index $DMRS_{id}$ is determined first in an ascending order of a DMRS port index and second in an ascending order of a DMRS sequence index [4, TS 38.211]

third, in increasing order of time resource indexes $t_{id}$ for time multiplexed PUSCH occasions within a PUSCH slot fourth, in increasing order of indexes for $N_s$ PUSCH slots where $N_{preamble}$=ceil($T_{preamble}/T_{PUSCH}$), $T_{preamble}$ is a total number of valid PRACH occasions per association pattern period multiplied by the number of preambles per valid PRACH occasion provided by msgA-PUSCH-PreambleGroup, and $T_{PUSCH}$ is a total number of valid PUSCH occasions per PUSCH configuration per association pattern period multiplied by the number of DMRS resource indexes per valid PUSCH occasion provided by msgA-DMRS-Config.

New PRACH Format for NTN

To design a suitable PRACH format for both UL timing estimation and UL frequency estimation, it is imperative to first understand why the existing NR PRACH formats based on ZC sequences cannot meet the target. It is well known that there are several peaks in the ambiguity function of ZC sequences in the Delay-Doppler plane, leading to many timing and Doppler ambiguities. Due to the nature of ZC sequences, both delay and frequency shift cause cyclic shift in the observation window of received ZC sequences at the gNB. As a result, two issues may arise:

1) It is difficult, if not impossible, to separate the two effects (delay and frequency shifts) by observing the composite cyclic shift. Separating them in order to estimate delay and/or frequency shift is needed. This issue exists even if cyclic shifted ZC sequences with the same root are not used; and
2) If cyclic shifted ZC sequences are used, the composite shift may make sequence A become sequence B, leading to misdetection. This issue has resulted in the introduction of restricted sets in PRACH formats.

As an example, to illustrate the timing and Doppler ambiguities in PRACH, assume zero delay and 1.25 KHz frequency offset between transmitter and receiver. The receiver aims to estimate delay and frequency offset by cross correlating the received signal with its reference copy of the transmitted signal. The correlation is performed at multiple hypotheses of frequency offsets that are on the step size of 1.25 KHz. The sampling rate is 30.72 MHz. The cross correlation results are plotted in FIG. 12(a) and FIG. 12(b) for ZC sequences with roots 56 and 714, respectively. The correlation values in each figure are normalized by the maximum correlation value, yielding a maximum value of 0 dB in each figure. It is clear that in either FIG. 12(a) or FIG. 12(b) multiple correlation peaks of the same height are observed. This implies that it is impossible to separate the effects of delay and frequency offset in PRACH in the presence of both large timing and frequency uncertainties, leading to difficulties in timing estimate at the gNB and misdetection of random access preambles.

The timing and frequency offset ambiguities of ZC sequences can be understood by examining their theoretical properties. To this end, the following notation is introduced:

$N_{ZC}$: the length of a ZC sequence
u: the root of a ZC sequence, and $0<u<N_{ZC}$
p: the inverse modulo $N_{ZC}$ of u, i.e., (p*u) mod $N_{ZC}$=1, and $0<p<N_{ZC}$
$f_{SC}$: the subcarrier spacing of an Orthogonal Frequency Division Multiplexing (OFDM) signal
$\Delta f$: the frequency offset between transmitted and received signals
$n_0$: the delay of received signals relative to the transmitted signal Let us consider the following form of ZC sequences:

$$x_u[n] = \exp\left(-\frac{j\pi un(n+1)}{N_{ZC}}\right), n = 0, 1, \ldots, N_{ZC} - 1.$$

If $N_{ZC}$ is prime, each u is associated with a unique inverse modulo $N_{ZC}$. It can be shown that if $k=\Delta f/f_{SC}$ (and for simplicity k is assumed to be an integer), the peak of cross correlation of the transmitted and received signals is located at the position of $(n_0+kp)$ mod $N_{ZC}$. Clearly, both delay and frequency shift cause cyclic shift in the received ZC sequences, resulting in a composite cyclic shift from which the effect of delay cannot be separated from the effect of frequency shift.

The above analysis also sheds light on how to design a PRACH format to resolve the timing and frequency offset ambiguities. Intuitively, two equations can be used to solve for two unknowns (delay and frequency offset). In particular, if a transmitter sends two signals based on two ZC sequences (that have different properties), the receiver can resolve the timing and frequency offset ambiguities by processing the two received signals.

For example, for two ZC sequences with roots u and −u respectively, the peak of cross correlation of the transmitted and received signals locate at two positions:

Position 1: $s_1=(n_0+kp)$ mod $N_{ZC}$
Position 2: $s_2=(n_0-kp)$ mod $N_{ZC}$

In this case, the second ZC sequence can be treated as the complex conjugate of the first ZC sequence, as shown in FIG. 13. With two equations, the delay no can be estimated as $$n_0 = \frac{(s_1 + s_2) \bmod N_{ZC}}{2}$$

Once the delay is estimated, the frequency offset can then be readily estimated.

Note that for simplicity, it can be assumed that the frequency offset is an integer multiple of the subcarrier spacing. For more general cases, it can be shown that the squared autocorrelation of ZC sequence is given by [4]

$$|\gamma(n_0, \Delta f)|^2 = \left|\sin c\left(\frac{\Delta f}{f_{SC}} - un_0\right)\right|^2.$$

Here the sinc function is defined as sinc $$\sin c(x) = \frac{1}{N}\frac{\sin(\pi x)}{\sin(\pi x/N)}.$$

Then, by processing the two received ZC sequences with roots u and −u respectively, the delay $n_0$ and the frequency offset $\Delta f$ can be estimated accordingly.

It should be noted that the PRACH format illustrated in FIG. 13 has minimal specification impact. The transmission of the first ZC sequence follows an existing NR PRACH format, and the change would be merely to request one additional transmission of a second ZC sequence that is the complex conjugate of the first ZC sequence.

FIG. 14 illustrates time domain concatenation, frequency domain concatenation, and time/frequency domain concatenation of PRACH sequences.

PRACH Options Proposed in 3GPP Rel-16 NTN SI

In 3GPP Rel-16 study item on NTN, the following design options for NTN PRACH were proposed:
Option 1: One ZC sequence with larger subcarrier spacing (SCS), repetition number.
Option 2: Multiple ZC sequences with new root pairs. This includes the case with two ZC sequences with an existing root and a complex-conjugate root.
Option 3: A new PRACH preamble based on gold/m-sequences.
Option 4: A single Zadoff-Chu sequence with combination of scrambling sequence.

It is expected that further progress on these solutions will occur during the normative phase of Rel-17 NTN WI.

SUMMARY

In some embodiments, a method is performed by a wireless communication device for random access. The method includes determining one or more random access occasions for transmission of a random access channel. The method includes transmitting the random access channel on the determined one or more random access occasions.

In some embodiments, determining the one or more random access occasions for transmission of a random access channel includes determining the one or more random access occasions for transmission of the random access channel with two (or more) sequences (i.e., two (or more) random access preambles). In some embodiments, transmitting the random access channel includes transmitting the random access channel with the two (or more) sequences on the determined one or more random access occasions.

In some embodiments, determining the one or more random access occasions for transmission of the random access channel with two (or more) sequences includes determining two random access occasions for transmission of the random access channel with two sequences. In some embodiments, the two random access occasions are concatenated in the time-domain.

In some embodiments, determining two random access occasions for transmission of the random access channel with two sequences includes receiving a random access parameter that indicates one of a plurality of defined random access configurations defined for transmission of a random access channel with two sequences and determining the two random access occasions based on the received random access parameter.

In some embodiments, the plurality of defined random access configurations defined for transmission of a random access channel with two sequences is included in a table, and the random access parameter is an index to the table.

In some embodiments, the table is a table defined for Non-Terrestrial Network (NTN) specific random access.

In some embodiments, the index is an index defined specifically for NTN specific random access.

In some embodiments, the index is an index defined for both normal random access and NTN specific random access.

In some embodiments, determining two random access occasions for transmission of the random access channel with two sequences includes determining that a random access parameter that indicates one of a plurality of defined random access configurations defined for transmission of a random access channel with two sequences has been configured for the wireless communication device and determining the two random access occasions and a random access preamble format for the two sequences based on the random access parameter responsive to determining that the random access parameter has been configured for the wireless communication device.

In some embodiments, determining two random access occasions for transmission of the random access channel with two sequences includes indirectly obtaining a new Physical Random Access Channel (PRACH) configuration comprising the two random access occasions from a legacy PRACH configuration.

In some embodiments, determining two random access occasions for transmission of the random access channel with two sequences includes receiving a random access parameter that defines a legacy random access configuration and reinterpreting the legacy random access configuration to infer a new random access configuration that includes the two random access occasions for transmission of the random access channel with two sequences.

In some embodiments, reinterpreting the legacy random access configuration to infer the new random access configuration that includes the two random access occasions for transmission of the random access channel with two sequences includes reinterpreting a New Radio (NR) PRACH, configuration for transmission of a format 1 or format 2 preamble as a NR PRACH configuration for transmission of the two sequences as two NR PRACH format 0 preambles.

In some embodiments, reinterpreting the legacy random access configuration to infer the new random access configuration that includes the two random access occasions for transmission of the random access channel with two sequences includes reinterpreting a NR PRACH configuration for transmission of a format 3 preamble as a NR PRACH configuration for transmission of the two sequences as a NR PRACH format 0 preamble followed by a NR PRACH format 1 preamble.

In some embodiments, determining two random access occasions for transmission of the random access channel with two sequences includes receiving a random access parameter that indicates a random access configuration and selecting two consecutive random access occasions from a set of random access occasions defined by the random access configuration as the two random access occasions for transmission of the random access channel with two sequences.

In some embodiments, determining two random access occasions for transmission of the random access channel with two sequences includes receiving a random access parameter that indicates a random access configuration and selecting two consecutive random access occasions from a set of random access occasions defined by the random access configuration as the two random access occasions for transmission of the random access channel with two sequences.

In some embodiments, determining two random access occasions for transmission of the random access channel with two sequences includes receiving a random access parameter that indicates a random access configuration, the random access configuration defining one or more existing random access occasions and selecting the two or more random access occasions for transmission of the random access channel with two sequences from among a set of random access occasions that includes the one or more existing random access occasions and one or more additional random access occasions that are time division multiplexed with the one or more existing random access occasions.

In some embodiments, the two random access occasions are concatenated in the frequency-domain. In some embodiments, determining two random access occasions for transmission of the random access channel with two sequences includes receiving a random access parameter that determines a number of contiguous random access occasions in the frequency-domain and determining the two random access occasions for transmission of the random access channel with two sequences based on the random access parameter.

In some embodiments, determining two random access occasions for transmission of the random access channel with two sequences includes receiving a random access parameter that indicates a random access configuration, the random access configuration defining one or more existing random access occasions and selecting the two or more random access occasions for transmission of the random access channel with two sequences from among a set of random access occasions that includes the one or more existing random access occasions and one or more additional random access occasions that are frequency division multiplexed with the one or more existing random access occasions.

In some embodiments, determining two random access occasions for transmission of the random access channel with two sequences includes receiving a random access parameter that indicates a random access configuration from among a plurality of random access configurations that include random access occasions that are frequency division multiplexed and determining one of the plurality of random access configurations based on the random access parameter.

In some embodiments, determining the one or more random access occasions for transmission of the random access channel with two (or more) sequences includes determining a random access occasion for joint transmission of the two sequences, and transmitting the random access channel includes jointly transmitting the two sequences in the determined random access occasion on the same time and frequency resources.

In some embodiments, a guard band is configured between the random access occasions.

In some embodiments, the determined random access occasions are a subset of a set of random access occasions configured for normal random access.

In some embodiments, the determined random access occasions are time division multiplexed with random access occasions configured for normal random access.

In some embodiments, the determined random access occasions are frequency division multiplexed with random access occasions configured for normal random access.

In some embodiments, the determined random access occasions are frequency division multiplexed and are consecutive.

In some embodiments, a wireless communication device for random access is proposed. The wireless communication device is adapted to determine one or more random access occasions for transmission of a random access channel. The wireless communication device is adapted to transmit the random access channel on the determined one or more random access occasions.

In some embodiments, a method is performed by a radio access node for configuring a wireless communication device for random access. The method includes configuring the wireless communication device with one or more random access occasions for transmission of a random access channel with two (or more) sequences (i.e., two (or more) random access preambles). In some embodiments, the method further includes receiving a random access channel with two (or more) sequences on the configured one or more random access occasions.

In some embodiments, a radio access node is proposed for configuring a wireless communication device for random access. The radio access node is adapted to configure the wireless communication device with one or more random access occasions for transmission of a random access channel with two (or more) sequences (i.e., two (or more) random access preambles). In some embodiments, the radio access node is adapted to receive a random access channel with two (or more) sequences on the configured one or more random access occasions.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

Figure 1:
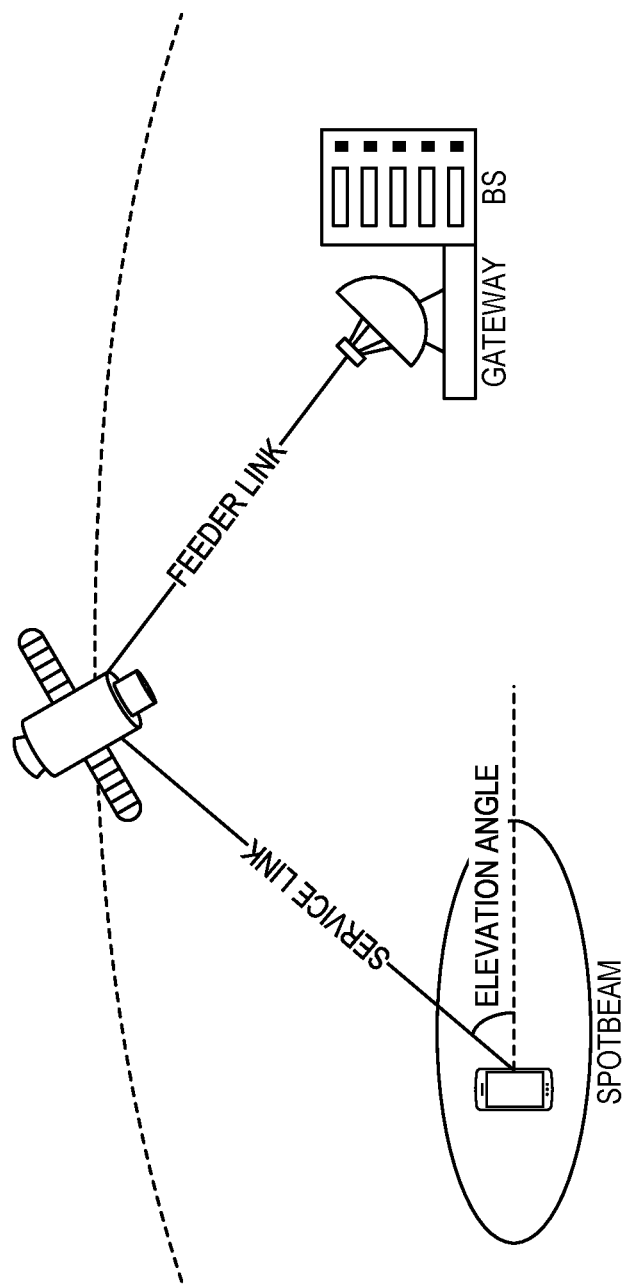
FIG. 1 depicts an example architecture of a satellite network with bent pipe transponders.
Figure 2:
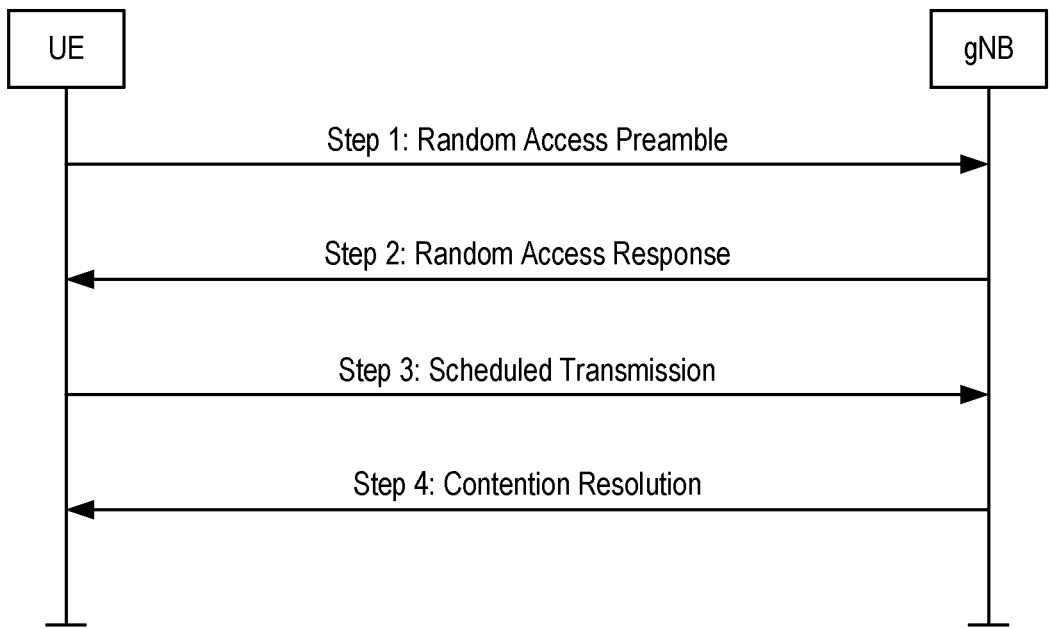
FIG. 2 depicts frequent handover rate when elevation angle of a currently serving satellite approaches an elevation angle threshold.
Figure 3:
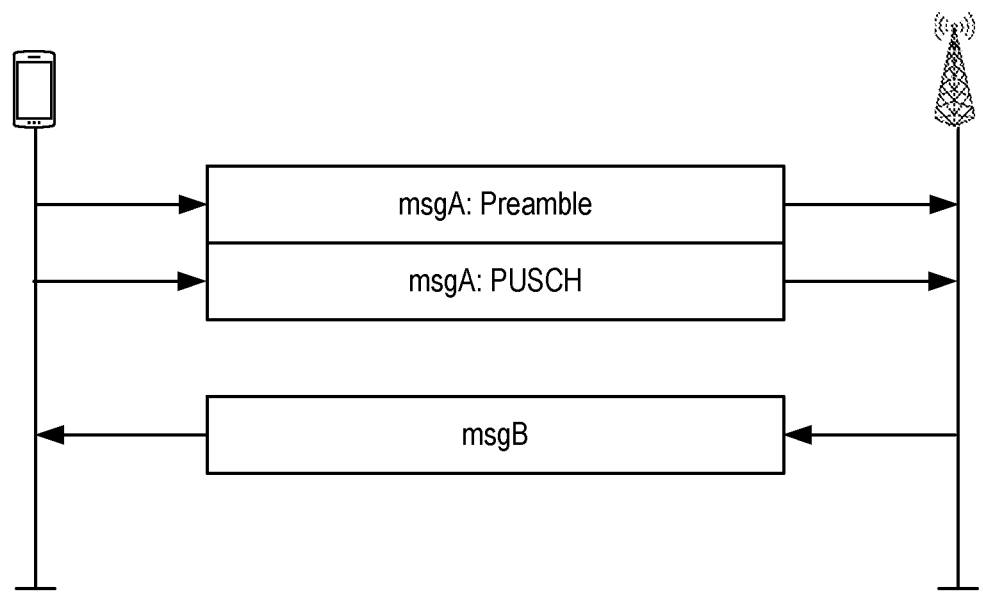
FIG. 3 illustrates 2-step random access procedure (e.g., Type-2 random access procedure in Third Generation Partnership Project (3GPP) TS 38.213, etc.)
Figure 4:
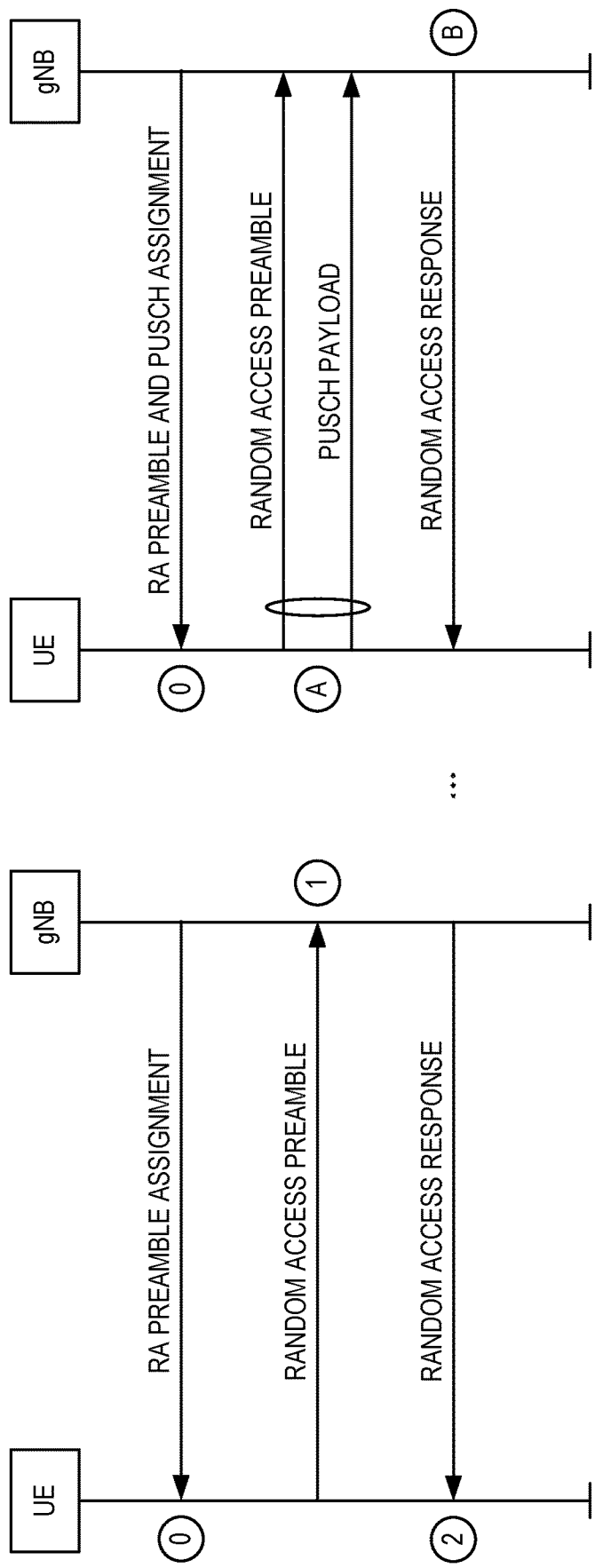
FIG. 4 depicts a Contention-Free Random Access (CFRA) procedure.
Figure 5:
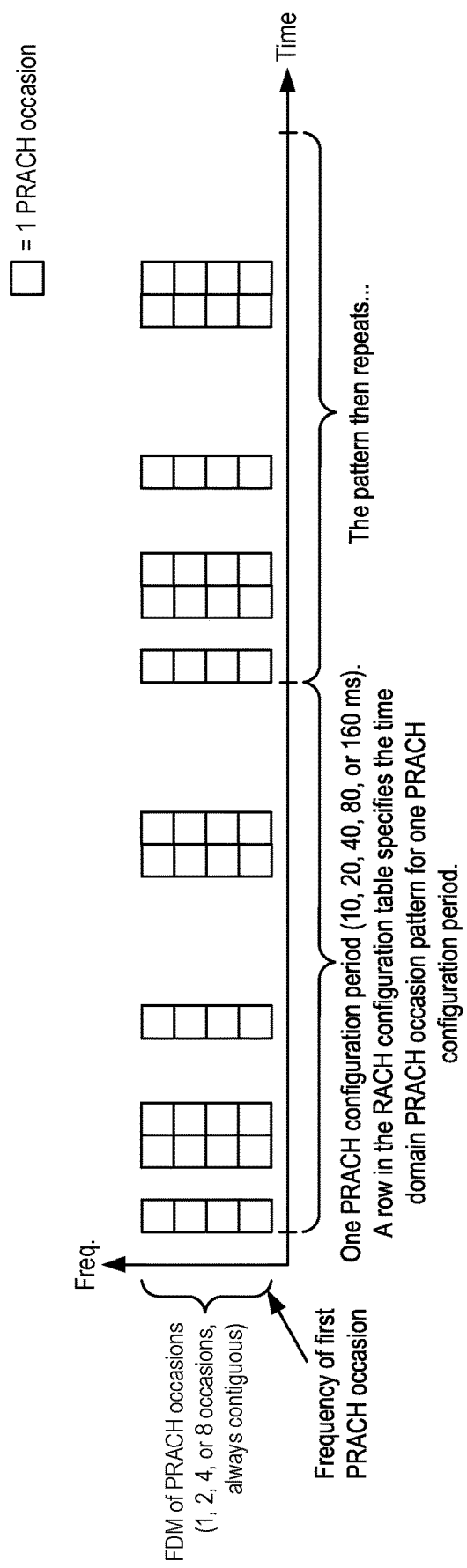
FIG. 5 depicts an example of Physical Random Access Channel (PRACH) occasion configuration in New Radio (NR)
Figure 6:
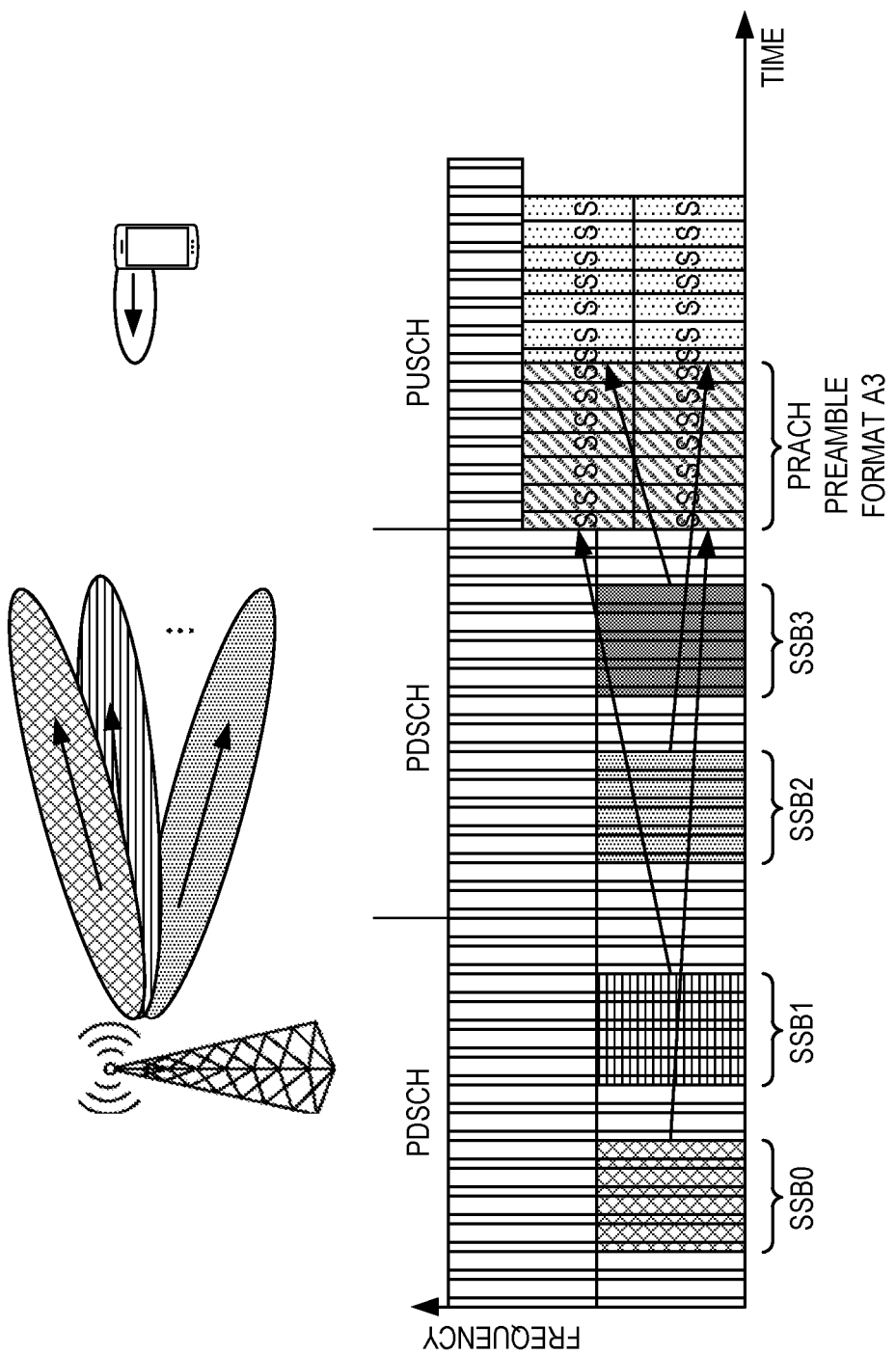
FIG. 6 illustrates NR Rel-15 support for one-to-one, one-to-many, and many-to-one association for one Synchronization Signals (SS) and Physical Broadcast Channel (PBCH) block (SSB) per PRACH occasion.
Figure 7:
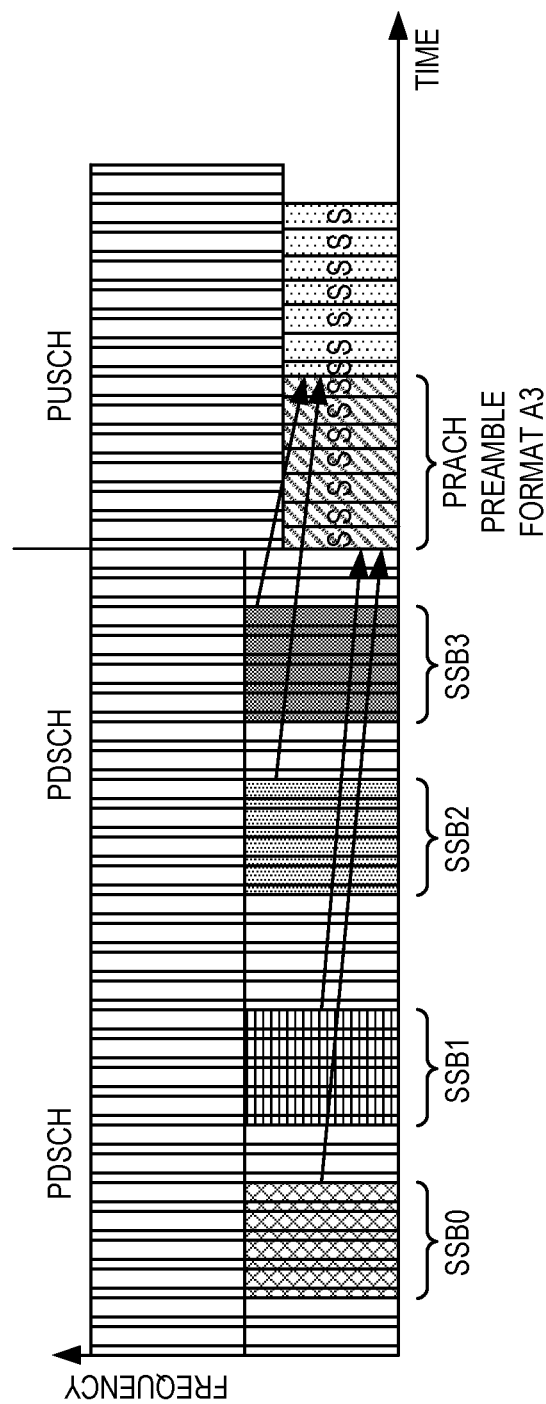
FIG. 7 illustrates NR Rel-15 support for one-to-one, one-to-many, and many-to-one association for twos SSB per PRACH occasion.
Figure 8:
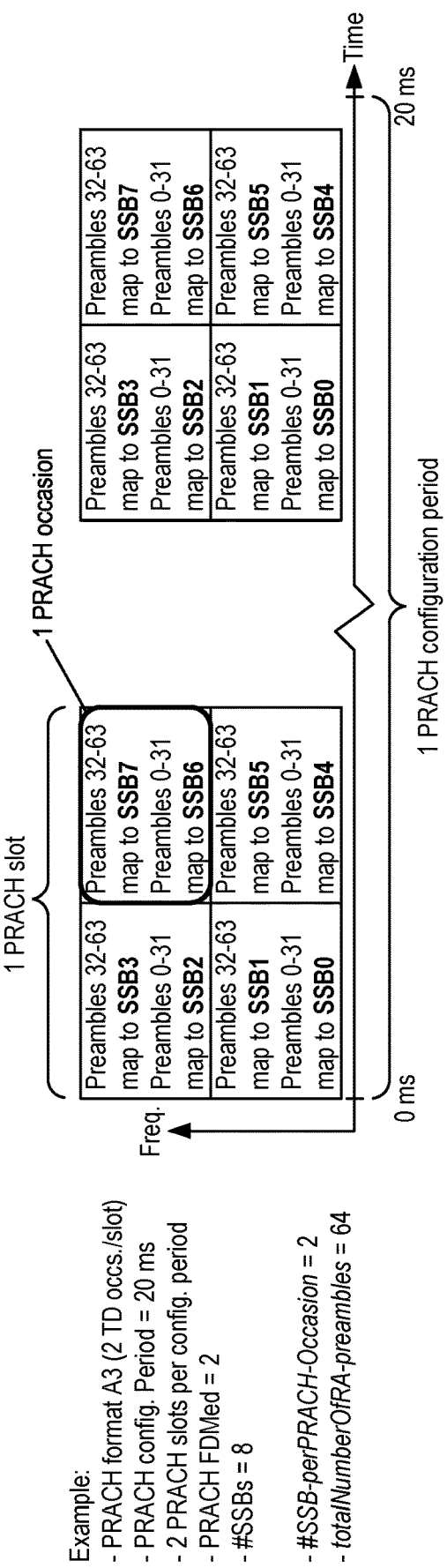
FIG. 8 depicts an example of the mapping between SSBs and random-access preambles in different PRACH occasions.
Figure 9:
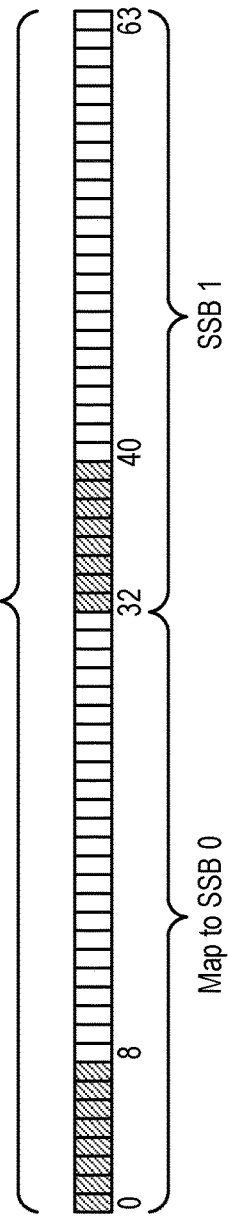
FIG. 9 illustrates consecutive mapping of preamble indices for Contention-Based Random Access (CBRA) and CFRA for one SSB in one PRACH occasion.
Figure 10:
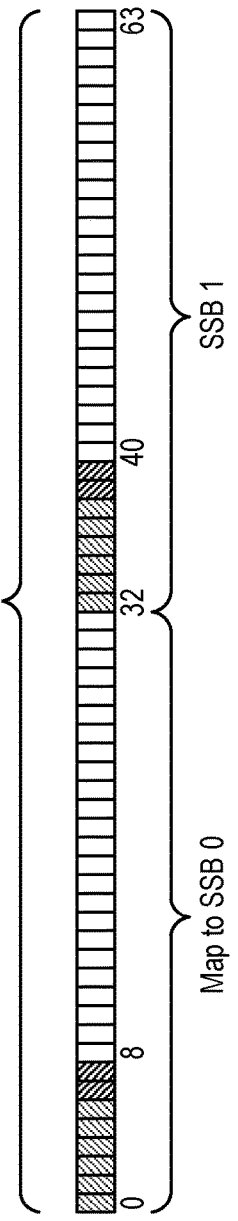
FIG. 10 illustrates an example of Random Access Preamble group B configuration for CBRA.
Figure 11:
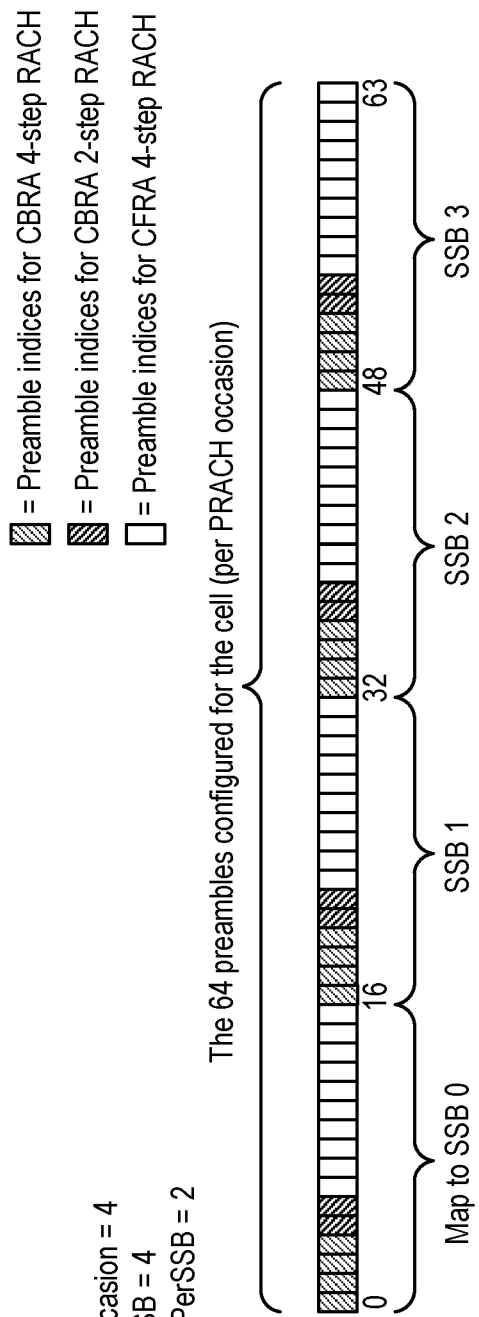
FIG. 11 illustrates an example of SSB to Random Access Channel (RACH) Occasion (RO) mapping and preamble allocation when ROs for 2-step RACH and 4-step RACH are shared.
Figure 12A:
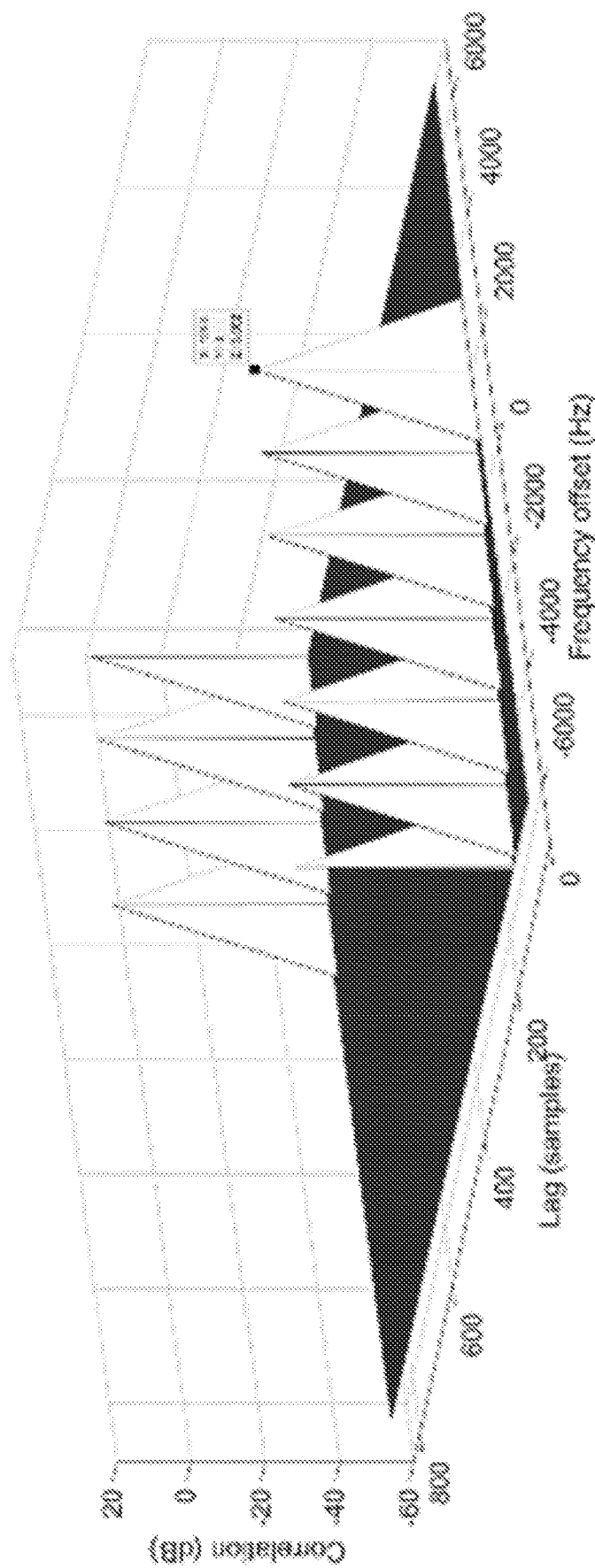
FIG. 12(a) illustrates cross correlation results for Zadoff-Chu (ZC) sequences with root 56.
Figure 12B:
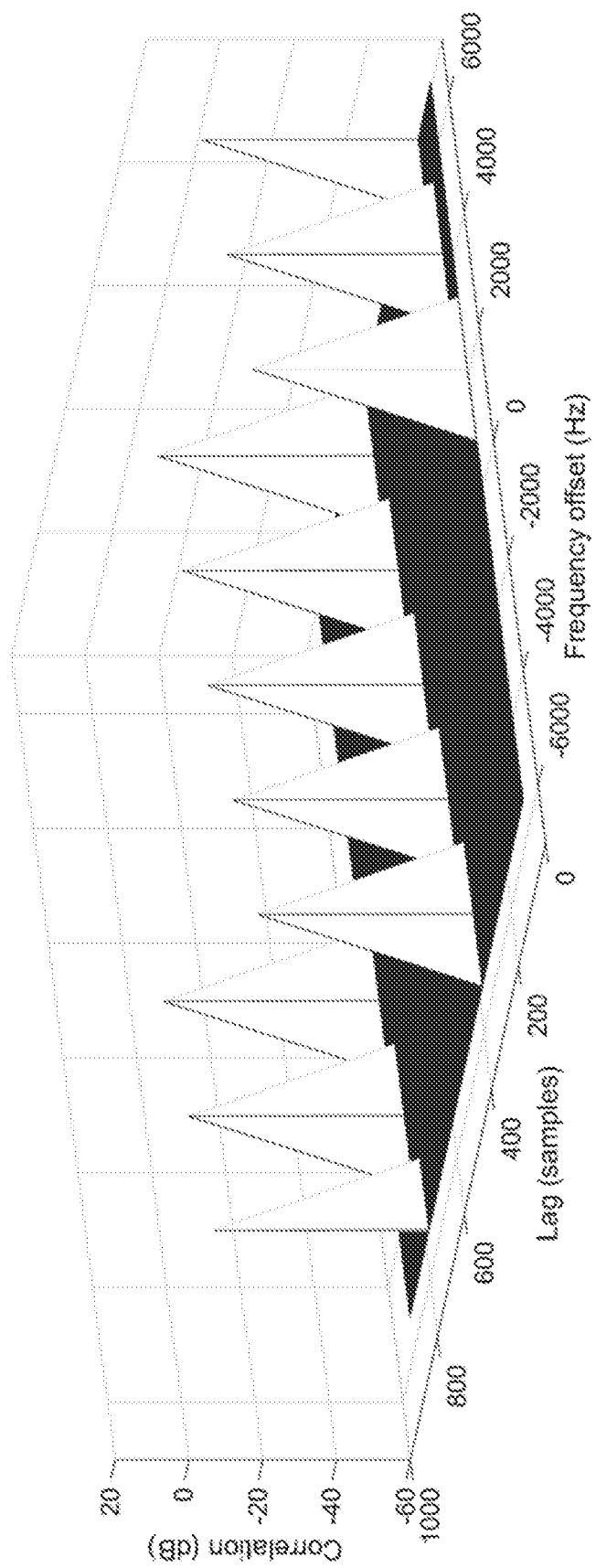
FIG. 12(b) illustrates cross correlation results for ZC sequences with root 714.
Figure 13:
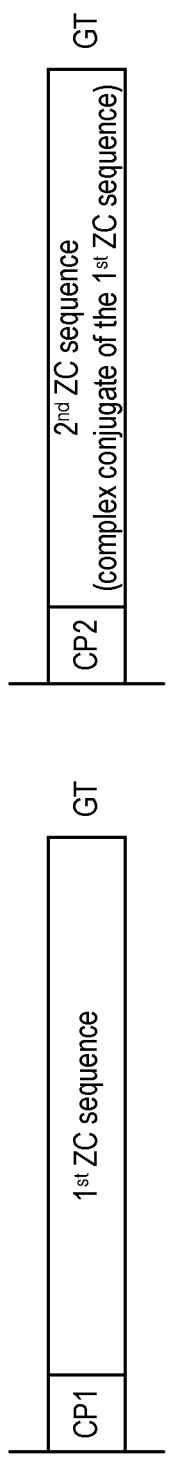
FIG. 13 illustrates a second ZC sequence as a complex conjugate of a first ZC sequence.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Radio Node: As used herein, a "radio node" is either a radio access node or a wireless communication device.

Radio Access Node: As used herein, a "radio access node" or "radio network node" or "radio access network node" is any node in a Radio Access Network (RAN) of a cellular communications network that operates to wirelessly transmit and/or receive signals. Some examples of a radio access node include, but are not limited to, a base station (e.g., a New Radio (NR) base station (gNB) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), a relay node, a network node that implements part of the functionality of a base station (e.g., a network node that implements a gNB Central Unit (gNB-CU) or a network node that implements a gNB Distributed Unit (gNB-DU)) or a network node that implements part of the functionality of some other type of radio access node.

Core Network Node: As used herein, a "core network node" is any type of node in a core network or any node that implements a core network function. Some examples of a core network node include, e.g., a Mobility Management Entity (MME), a Packet Data Network Gateway (P-GW), a Service Capability Exposure Function (SCEF), a Home Subscriber Server (HSS), or the like. Some other examples of a core network node include a node implementing an Access and Mobility Management Function (AMF), a User Plane Function (UPF), a Session Management Function (SMF), an Authentication Server Function (AUSF), a Network Slice Selection Function (NSSF), a Network Exposure Function (NEF), a Network Function (NF) Repository Function (NRF), a Policy Control Function (PCF), a Unified Data Management (UDM), or the like.

Communication Device: As used herein, a "communication device" is any type of device that has access to an access network. Some examples of a communication device include, but are not limited to: mobile phone, smart phone, sensor device, meter, vehicle, household appliance, medical appliance, media player, camera, or any type of consumer electronic, for instance, but not limited to, a television, radio, lighting arrangement, tablet computer, laptop, or Personal Computer (PC). The communication device may be a portable, hand-held, computer-comprised, or vehicle-mounted mobile device, enabled to communicate voice and/or data via a wireless or wireline connection.

Wireless Communication Device: One type of communication device is a wireless communication device, which may be any type of wireless device that has access to (i.e., is served by) a wireless network (e.g., a cellular network). Some examples of a wireless communication device include, but are not limited to: a User Equipment device (UE) in a 3GPP network, a Machine Type Communication (MTC) device, and an Internet of Things (IoT) device. Such wireless communication devices may be, or may be integrated into, a mobile phone, smart phone, sensor device, meter, vehicle, household appliance, medical appliance, media player, camera, or any type of consumer electronic, for instance, but not limited to, a television, radio, lighting arrangement, tablet computer, laptop, or PC. The wireless communication device may be a portable, hand-held, computer-comprised, or vehicle-mounted mobile device, enabled to communicate voice and/or data via a wireless connection.

Network Node: As used herein, a "network node" is any node that is either part of the RAN or the core network of a cellular communications network/system.

In this document, the term "normal RA" or "legacy RA" is used to refer to the NR random access (RA) mechanism (including Physical Random Access Channel (PRACH) configurations, and associated random access procedures) as defined in 3GPP Release 15 and Release 16 for 4-step Random Access Channel (RACH) and 2-step RACH. The term "NTN-specific RA" to refer to the random access mechanism (including PRACH configurations, and associated random access procedures) as defined for Non-Terrestrial Network (NTN) scenarios. Typically, normal RA and NTN-specific RA will be configured on separate time/frequency resources.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell"; however, particularly with respect to 5G NR concepts, beams may be used instead of cells and, as such, it is important to note that the concepts described herein are equally applicable to both cells and beams.

There currently exist certain challenge(s). Rel-15 NR standard has been designed with terrestrial networks in mind. The existing NR procedures including random access need to be adapted to cater to the large delay and Doppler shift in a NTN. For example, none of the existing NR PRACH formats can cope with the large differential Doppler shifts in NTN. To address this, a set of solutions, e.g., a new PRACH format consisting of two Zadoff-Chu (ZC) sequences with different roots, are proposed for NTN-specific PRACH design in NR release 16 in the study item for NR over NTN. To support NTN-specific PRACH design, the existing NR PRACH configurations need to be revisited.

Certain aspects of the present disclosure and their embodiments may provide solutions to the aforementioned or other challenges. Embodiments of various methods on the NTN-specific PRACH configuration in NR are disclosed herein. Embodiments of the proposed methods cover the configuration of the PRACH formats, PRACH configurations in time/frequency domain for random access in an NTN scenario with high Doppler shift, the PRACH configurations for different RA types, and the coexistence of PRACH configurations for normal random access and the PRACH configurations for NTN-specific random access.

Some specific methods are provided in the section of the present disclosure titled "Methods on selecting PRACH occasions for the transmission of a PRACH with 2 sequences in NTN" for the 2-ZC-sequence NTN-specific PRACH design (to cope with the high Doppler shift and large Round Trip Time (RTT) issue) on top of the normal PRACH design (single ZC sequence PRACH).

Some general methods are also provided in the section of the present disclosure titled "Other general methods (not only for the solution for PRACH format with 2 ZC sequences) on NTN-specific PRACH configurations" for any types of NTN-specific PRACH design.

Certain embodiments may provide one or more of the following technical advantage(s). Embodiments of the solutions disclosed herein provide a simple way for configuring the RACH occasions (ROs) in time domain and frequency domain for NTN scenarios with high differential Doppler shifts.

Embodiments of the solutions disclosed herein seek to minimize the changes to existing procedures while implementing the NTN random access procedures.

Embodiments of the solutions disclosed herein also consider possible coexistence of PRACH configuration for normal RA and NTN-specific RACH configuration for NTN-specific RA, and the PRACH configurations for both 2-step RACH and 4-step RACH.

Figure 15:
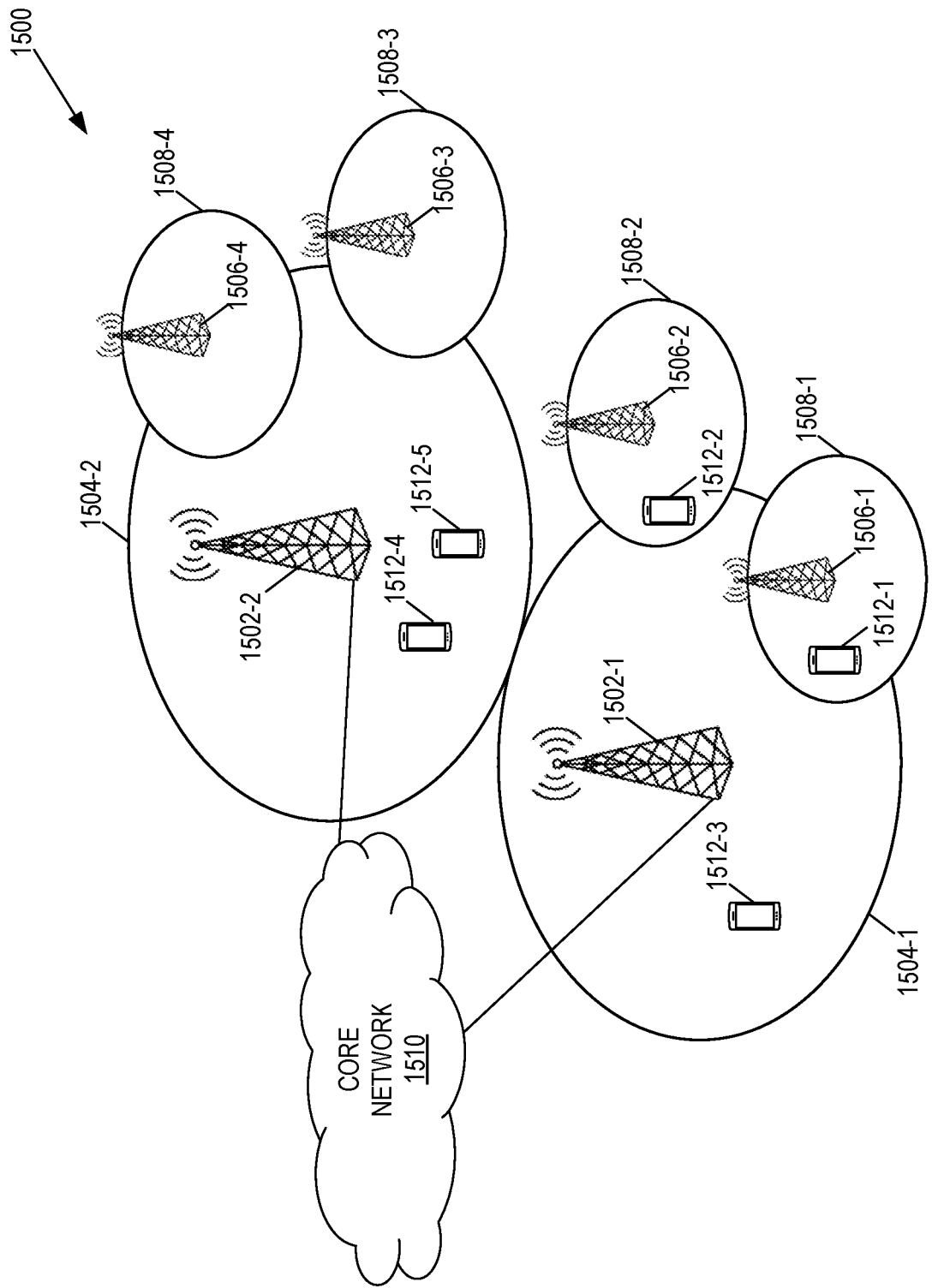
FIG. 15 illustrates one example of a cellular communications system in which embodiments of the present disclosure may be implemented.

FIG. 15 illustrates one example of a cellular communications system 1500 in which embodiments of the present disclosure may be implemented. In the embodiments described herein, the cellular communications system 1500 is a 5G system (5GS) including a Next Generation RAN (NG-RAN) and a 5G Core (5GC); however, the present disclosure is not limited thereto. In this example, the RAN includes radio access nodes 1502-1 and 1502-2 having corresponding (macro) cells 1504-1 and 1504-2. The radio access nodes 1502-1 and 1502-2 are generally referred to herein collectively as radio access nodes 1502 and individually as radio access nodes 1502. The radio access nodes 1502 may include, for example, base stations (e.g., gNBs, ng-eNBs) and/or non-terrestrial radio access nodes (e.g., see FIG. 1). Likewise, the (macro) cells 1504-1 and 1504-2 are generally referred to herein collectively as (macro) cells 1504 and: individually as (macro) cell 1504. The RAN may also include a number of low power radio access nodes 1506-1 through 1506-4 controlling corresponding small cells 1508-1 through 1508-4. The low power radio access nodes 1506-1 through 1506-4 can be small base stations (such as pico or femto base stations) or Remote Radio Heads (RRHs), or the like. Notably, while not illustrated, one or more of the small cells 1508-1 through 1508-4 may alternatively be provided by the radio access node(s) 1502. The low power radio access nodes 1506-1 through 1506-4 are generally referred to herein collectively as low power radio access nodes 1506 and individually as low power radio access node 1506. Likewise, the small cells 1508-1 through 1508-4 are generally referred to herein collectively as small cells 1508 and individually as small cell 1508. The cellular communications system 1500 also includes a core network 1510, which in the 5G System (5GS) is referred to as the 5GC. The radio access nodes 1502 (and optionally the low power radio access nodes 1506) are connected to the core network 1510.

The radio access nodes 1502 and the low power nodes 1506 provide service to wireless communication devices 1512-1 through 1512-5 in the corresponding cells 1504 and 1508. The wireless communication devices 1512-1 through 1512-5 are generally referred to herein collectively as wireless communication devices 1512 and individually as wireless communication device 1512. In the following description, the wireless communication devices 1512 are oftentimes UEs and as such are also referred to herein as UEs 1512, but the present disclosure is not limited thereto.

Notably, at least some of the radio access nodes 1502 of the cellular communications system are non-terrestrial radio access nodes such as, for example, a radio access node including the satellite of FIG. 1 or a radio access node including both the satellite and Base Station (BS) of FIG. 1.

The following methods and embodiments assume that a UE (e.g., UE 1512) knows if it should apply NTN-specific PRACH configuration and procedure either based on its capability and/or based on information sent by the network. Furthermore, for the section of the disclosure titled "Methods on selecting PRACH occasions for the transmission of a PRACH with 2 sequences in NTN" (including sections of the disclosure from the section titled "Method 1 for PRACH configuration with time-domain concatenation" to the section titled "Method 5 for joint transmission of 2 preambles"), it is assumed that the UE knows how to select the roots for the 2 ZC sequences used in the concatenated preamble.

Figure 16:
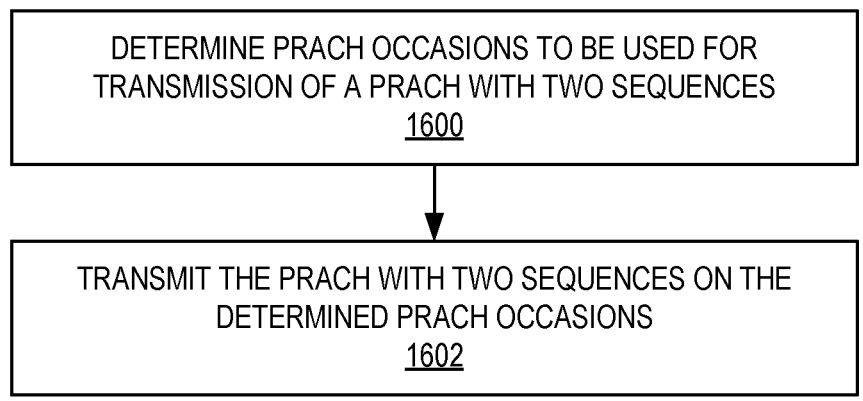
FIG. 16 illustrates the operation of a User Equipment (UE) in accordance with embodiments of the present disclosure.

Methods on Selecting PRACH Occasions for the Transmission of a PRACH with 2 Sequences in NTN FIG. 16 illustrates the operation of a UE 1512 in accordance with embodiments of the present disclosure. As illustrated, the UE 1512 determines (e.g., selects) PRACH occasions for transmission of a PRACH with two sequences (e.g., two ZC-sequences), e.g., in NTN (step 1600). The two sequences may be concatenated in the time-domain, concatenated in the frequency-domain, or concatenated in both the time-domain and the frequency-domain. Portions of the disclosure from the portion titled "Method 1 for PRACH configuration with time-domain concatenation" to the portion titled "Method 5 for joint transmission of 2 preambles") describe various embodiments for how the UE 1512 determines the PRACH occasions for transmission of a PRACH with two sequences in step 1600. The UE 1512 then transmits the PRACH with two sequences on the determined PRACH occasions (step 1602).

Method 1 for PRACH Configuration with Time-Domain Concatenation

This embodiment provides methods for configuring the PRACH configuration for NTN-specific PRACH formats where the two sequences are concatenated in the time domain. Both sequences are assumed to have the same PRACH format.

Figure 17:
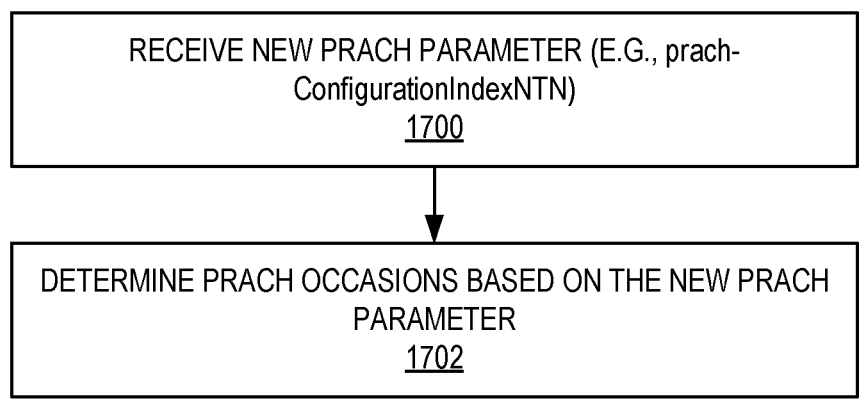
FIG. 17 illustrates a new PRACH parameter as a new Radio Resource Control (RRC) parameter prach-ConfigurationIndexNTN.

In one embodiment, new PRACH configurations are defined and a new PRACH parameter is defined. In the following description, the new PRACH parameter is a new Radio Resource Control (RRC) parameter prach-ConfigurationIndexNTN. This is illustrated in FIG. 17. As illustrated, when determining the PRACH occasions in step 1600, the UE 1512 receives a new PRACH parameter (step 1700) and determines the PRACH occasions to use for transmission of the PRACH with two sequences based on the received PRACH parameter and new PRACH configurations defined, e.g., for NTN (step 1702).

Example: For Frequency Range 1 (FR1) paired spectrum, the RRC parameter can indicate up to 256 configurations, some of which are illustrated in Table 2. For instance, prach-ConfigurationIndexNTN=25 indicates to the UE that the $4^{th}$, $7^{th}$, and $10^{th}$ subframe contain valid ROs where the UE may choose to transmit MSG1 using PRACH format 0. Note that due to time-domain concatenation, an NTN-specific preamble based on PRACH format 0 will span 2 subframes.

prach-ConfigurationIndexNTN INTEGER (0 . . . 255),

TABLE 2

Illustration of PRACH configuration table for NTN with time domain concatenation. Only a few rows are shown for brevity.

| PRACH Configuration Index | Preamble format | $n_{SFN}$ mod x = y | | Subframe number | Starting symbol | Number of PRACH slots within a subframe | $N_t^{RA, slot}$, number of time-domain PRACH occasions within a PRACH slot | $N_{dur}^{RA}$, PRACH duration |
|---|---|---|---|---|---|---|---|---|
| | | x | y | | | | | |
| 1 | 0 | 16 | 1 | 1 | 0 | — | — | 0 |
| 2 | 0 | 16 | 1 | 4 | 0 | — | — | 0 |
| 3 | 0 | 16 | 1 | 7 | 0 | — | — | 0 |
| 4 | 0 | 16 | 1 | 9 | 0 | — | — | 0 |
| 5 | 0 | 8 | 1 | 1 | 0 | — | — | 0 |
| 6 | 0 | 8 | 1 | 4 | 0 | — | — | 0 |
| 7 | 0 | 8 | 1 | 7 | 0 | — | — | 0 |
| 8 | 0 | 8 | 1 | 9 | 0 | — | — | 0 |
| 9 | 0 | 4 | 1 | 1 | 0 | — | — | 0 |
| 10 | 0 | 4 | 1 | 4 | 0 | — | — | 0 |
| 11 | 0 | 4 | 1 | 7 | 0 | — | — | 0 |
| 12 | 0 | 4 | 1 | 9 | 0 | — | — | 0 |
| 13 | 0 | 2 | 1 | 1 | 0 | — | — | 0 |
| 14 | 0 | 2 | 1 | 4 | 0 | — | — | 0 |
| 15 | 0 | 2 | 1 | 7 | 0 | — | — | 0 |
| 16 | 0 | 2 | 1 | 9 | 0 | — | — | 0 |
| 17 | 0 | 1 | 0 | 1 | 0 | — | — | 0 |
| 18 | 0 | 1 | 0 | 4 | 0 | — | — | 0 |
| 19 | 0 | 1 | 0 | 7 | 0 | — | — | 0 |
| 20 | 0 | 1 | 0 | 1, 6 | 0 | — | — | 0 |

TABLE 2-continued

Illustration of PRACH configuration table for NTN with time domain concatenation. Only a few rows are shown for brevity.

| PRACH Configuration Index | Preamble format | $n_{SFN}$ mod x = y | | Subframe number | Starting symbol | Number of PRACH slots within a subframe | $N_t^{RA,\ slot}$, number of time-domain PRACH occasions within a PRACH slot | $N_{dur}^{RA}$, PRACH duration |
|---|---|---|---|---|---|---|---|---|
| | | x | y | | | | | |
| 21 | 0 | 1 | 0 | 2, 7 | 0 | — | — | 0 |
| 22 | 0 | 1 | 0 | 3, 8 | 0 | — | — | 0 |
| 23 | 0 | 1 | 0 | 1, 4, 7 | 0 | — | — | 0 |
| 24 | 0 | 1 | 0 | 2, 5, 8 | 0 | — | — | 0 |
| 25 | 0 | 1 | 0 | 3, 6, 9 | 0 | — | — | 0 |

Figure 18:
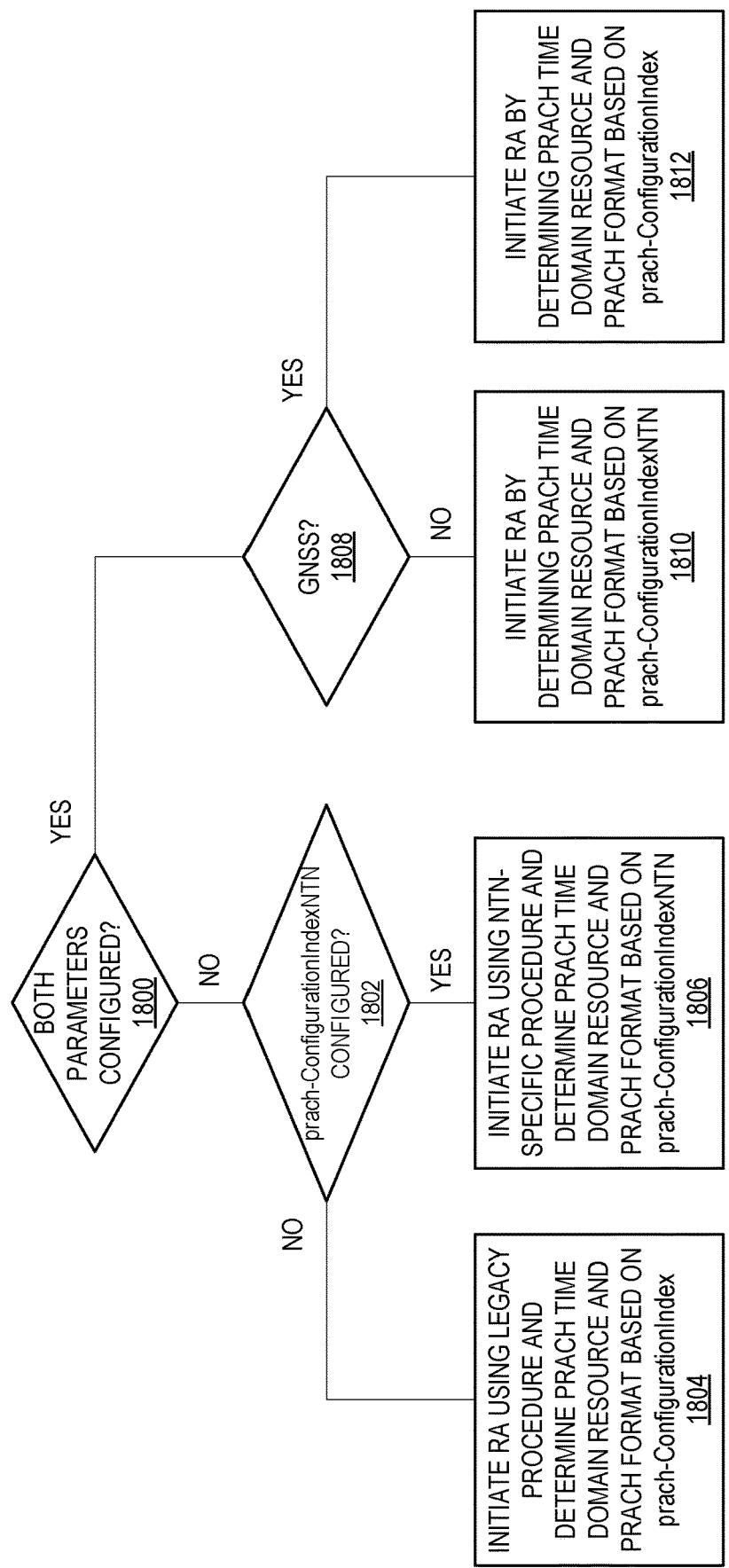
FIG. 18 depicts methods that can be utilized by a UE to infer useful information about PRACH configuration.

In some embodiments, a UE can use one or more of the following methods to infer useful information about PRACH configuration, as illustrated in FIG. 18. This method(s) may be performed as part of step 1602 (determining the PRACH occasions for transmission of PRACH with two sequences) of FIG. 16:
  If prach-ConfigurationIndexNTN is not configured (step 1802, NO), then the UE initiates random access using the legacy NR procedure and determines PRACH time domain resource and PRACH format based on prach-ConfigurationIndex (step 1804).
  If prach-ConfigurationIndexNTN is configured (step 1802, YES), then the UE initiates random access using the NTN-specific procedure and determines PRACH time domain resource (e.g., the PRACH occasions) and PRACH format based on prach-ConfigurationIndexNTN (step 1806).
  If both prach-ConfigurationIndex and prach-ConfigurationIndexNTN are configured (step 1800, YES), then, in one embodiment:
    the UE without Global Navigation Satellite System (GNSS) capability (step 1808, NO) initiates random access by determining PRACH time domain resource and PRACH format based on prach-ConfigurationIndexNTN (step 1810).
    In a sub-embodiment, the UE with GNSS-capability (step 1808, YES) initiates random access by determining PRACH time domain resource and PRACH format based on prach-ConfigurationIndex (1812).

Figure 19:
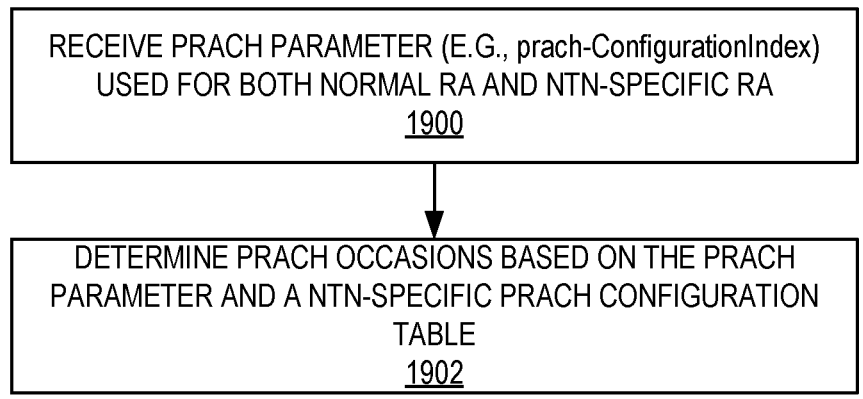
FIG. 19 illustrates a separate PRACH configuration table for Non-Terrestrial Network (NTN)-specific Random Access (RA) and utilization of prach-ConfigurationIndexNTN for both normal RA and NTN-specific RA.

In another embodiment, a separate PRACH configuration table is introduced for NTN-specific RA and same prach-ConfigurationIndex is used for both normal RA and NTN-specific RA. This is illustrated in FIG. 19. As illustrated, when determining the PRACH occasion(s) in step 1600, the UE 1512 receives a PRACH parameter (step 1900) (e.g., same prach-ConfigurationIndex used for both normal RA and NTN-specific RA) and determines the PRACH occasions to use for transmission of the PRACH with two sequences based on the received PRACH parameter and a PRACH configuration table defined for NTN-specific RA (step 1902).

Method 2 for (indirect) PRACH configuration with time-domain concatenation

In another embodiment, the NTN-specific PRACH configurations can be indirectly obtained from the legacy PRACH configuration, where one NTN-specific RO can include one or more of the existing ROs. This obviates the need of explicit RRC signaling for NTN PRACH configuration when both legacy and NTN-specific RA are to be supported.

As an example, Table 3 based on the PRACH configuration table 6.3.3.2-2 in TS38.211 V16.1.0 is included to explain the existing PRACH configurations for FR1 and paired spectrum/supplementary uplink. Let us see how to interpret the information given in Table 3 using a couple of examples:
  prach-ConfigurationIndex=0-27 correspond to NR PRACH format 0 preamble which requires 1 subframe to transmit. However, if the NTN-specific PRACH format based on NR PRACH format 0 is implemented via time-domain concatenation, the RO will span 2 subframes.
  prach-ConfigurationIndex=28-52 correspond to NR PRACH format 1 which requires 2 subframes to transmit.

TABLE 3

PRACH configuration index for various PRACH formats for FDD paired spectrum (FR1)

| NR PRACH format | prach-ConfigurationIndex | Preamble duration |
|---|---|---|
| 0 | 0-27 | 1 ms |
| 1 | 28-52 | 2 ms |
| 2 | 53-59 | 3 ms |
| 3 | 60-86 | 1 ms |
| A1/A2/A3/B1/B2/B3/B4/C0/C2 | 87-255 | <1 ms |

Figure 20:
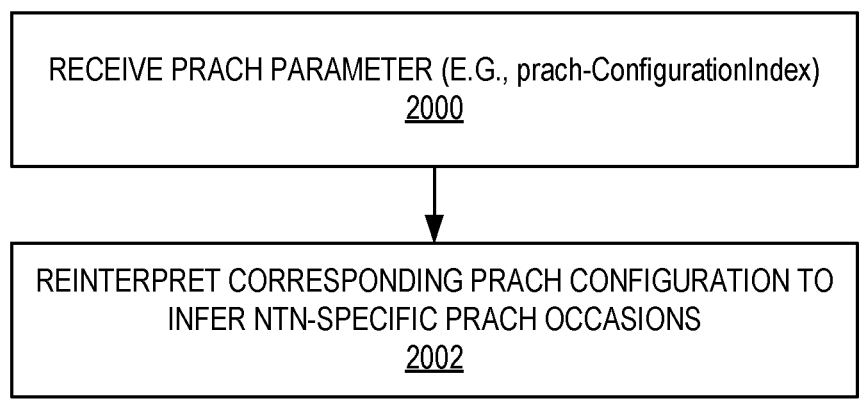
FIG. 20 illustrates UE reinterpretation of existing PRACH configuration to infer NTN-specific PRACH configuration.

In one embodiment, the UE reinterprets the existing PRACH configuration to infer NTN-specific PRACH configuration. This is illustrated in FIG. 20. As illustrated, when determining the PRACH occasions in step 1600, the UE 1512 receives a PRACH parameter (step 2000) (e.g., prach-ConfigurationIndex) and reinterprets the corresponding existing PRACH configuration to infer an NTN-specific PRACH configuration (step 2002). For example:
  If prach-ConfigurationIndex=28-52, instead of NR PRACH format 1, the UE generates an NTN-specific PRACH preamble based on two NR PRACH format 0 preambles and transmits it in the RO.
  If prach-ConfigurationIndex=53-59, instead of NR PRACH format 2, the UE generates an NTN-specific PRACH preamble based on two NR PRACH format 0 preambles and transmits it in the RO.
    In a sub-embodiment, the NTN-specific PRACH preamble transmission is initiated in the first slot of the RO.

In an alternate embodiment, if prach-ConfigurationIndex=53-59, instead of NR PRACH format 2, the UE generates an NTN-specific PRACH preamble based on a NR PRACH format 0 preamble followed by NR PRACH format 1 preamble and transmits it in the RO.

Similar rules can be developed if other PRACH formats are to be used for designing NTN-specific PRACH preamble.

Figure 21:
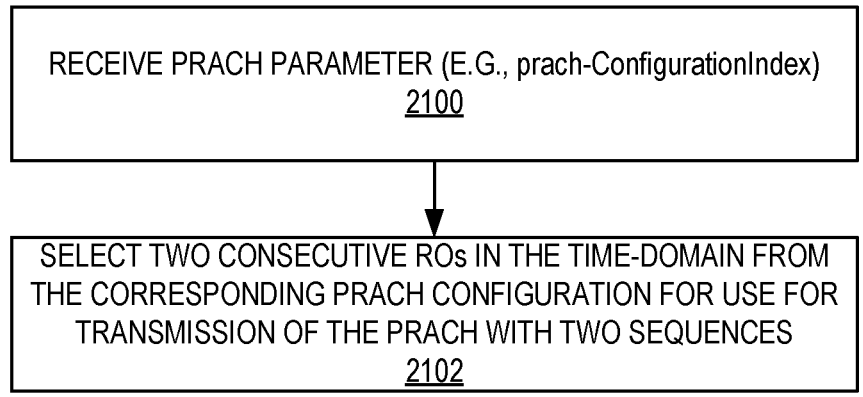
FIG. 21 illustrates utilization of two consecutive ROs in time domain for transmission of a PRACH for NTN-specific RA so that the PRACH format is aligned with the normal RA.

In another embodiment, two consecutive ROs in time domain can be used for transmission of a PRACH for NTN-specific RA so that the PRACH format is aligned with the normal RA. This is illustrated in FIG. 21. As illustrated, when determining the PRACH occasions in step 1600, the UE 1512 receives a PRACH parameter (step 2100) (e.g., prach-ConfigurationIndex) and selects two consecutive ROs in the time-domain from the corresponding PRACH configuration for use for transmission of the PRACH with two sequences (step 2102).

In above embodiment, if the gap between two consecutive ROs is larger than a determined threshold, the NTN-specific RA can be assumed to be not supported, where the threshold can be a predetermined value or configured in RRC.

With this method, the RO does not have to be used for some format with longer duration to transmit 2 preambles with different formats with shorter time duration.

Figure 22:
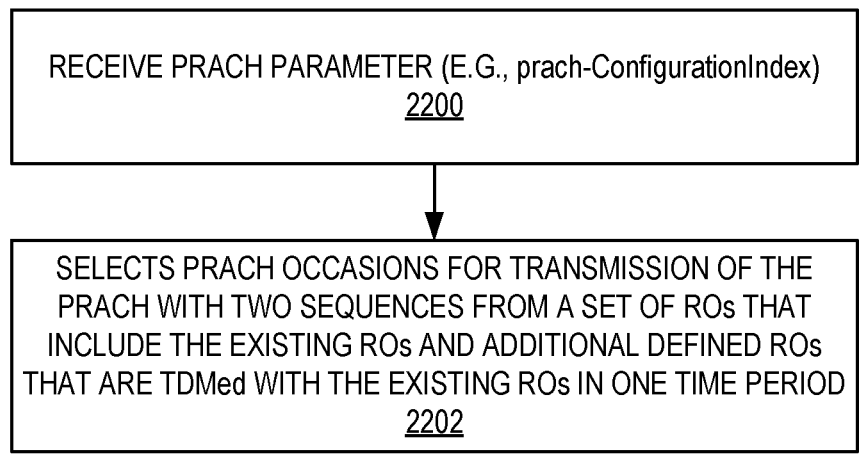
FIG. 22 illustrates definition of additional ROs on top of existing ROs where the additionally defined ROs and the existing ROs are Time Division Multiplex (TDM) ed in one time period that can be predetermined or RRC configured.

In another embodiment, some additional ROs in time domain can be defined on top of the existing ROs, where the additionally defined ROs and the existing ROs are Time Division Multiplexed (TDMed) in one time period, where the time period can be predetermined or RRC configured, e.g. in a system frame of 10 ms. This is illustrated in FIG. 22. As illustrated, when determining the PRACH occasions in step 1600, the UE 1512 receives a PRACH parameter (step 2200) (e.g., prach-ConfigurationIndex). The PRACH parameter corresponds to a PRACH configuration that includes one or more existing ROs in each of a number of time periods. The UE 1512 selects PRACH occasions for transmission of the PRACH with two sequences from a set of ROs that include the existing ROs and additional defined ROs that are TDMed with the existing ROs in one time period (step 2202).

The number of additional ROs and the start time of the $1^{st}$ RO can either be RRC configured or depend on the number and the starting Physical Resource Block (PRB) of the existing ROs, respectively.

The first RO selected for transmitting the $1^{st}$ sequence can depend on the existing Synchronization Signal Block (SSB) to RO mapping and the SSB selected, the $2^{nd}$ RO selected to transmit the $2^{nd}$ sequence can be either in a predetermined manner (e.g., a mapping between $1^{st}$ RO and $2^{nd}$ RO can be introduced in the specification) or configurable (e.g., the distance or the RO number difference between the $1^{st}$ RO and $2^{nd}$ RO can be configured by RRC signaling).

With this method, at least 2 ROs will be available for selecting RO pair for the transmission of the 2 sequences in NTN in one period of time considered. The only difference between additional ROs and existing ROs is the time position. And the $2^{nd}$ RO selection can be based on the $1^{st}$ RO selected which makes it possible to reuse the existing procedure of RA resource selection specified.

Figure 23:
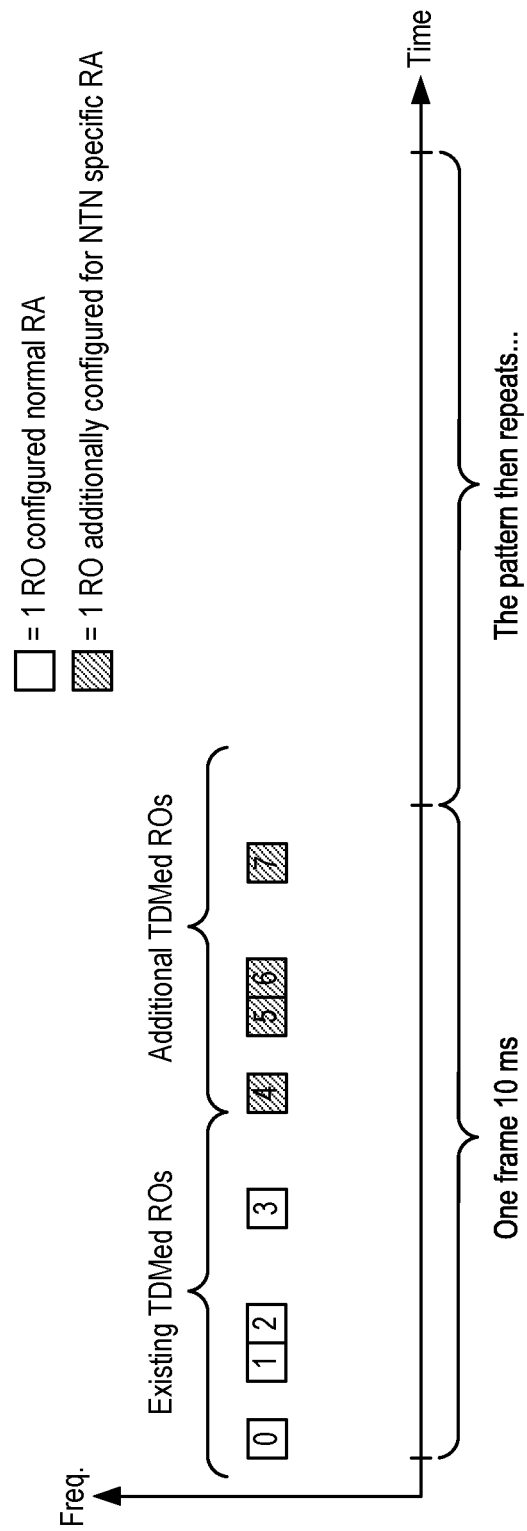
FIG. 23 illustrates an example of TDMed existing ROs and additional ROs for double sequence transmission.

FIG. 23 illustrates an example of TDMed existing ROs and additional ROs for double sequence transmission. In this example, the PRACH configuration signaling only defines 4 existing ROs TDMed in 10 ms, additional 4 ROs are defined. The whole set of ROs are numbered from 0 to 7.

For the NTN-specific RA, the ROs to be used to transmit 2 sequences can be on the predetermined set of pairs of ROs, e.g. {RO0, RO4}, {RO1, RO5}, {RO2, RO6}, {RO3, RO7}. In another way, the RO pair can be determined by {ROx, ROy}, where y=(x+1) mod N assuming 2 ROs with ID difference 1, N is the total number of ROs in a considered time period. ROx is the $1^{st}$ RO selected by UE for RA depending on the SSB to RO mapping.

In a variant of this embodiment, the number of additional ROs depends on the number of existing of ROs configured. One or more of the following rules can be introduced:

The additional number of ROs can be zero when the existing number of ROs are already larger than a predetermined threshold.
  E.g., the threshold is 4 ROs, i.e. when the number of existing ROs is 8, no additional ROs are allowed considering that only {1, 2, 4, 8} ROs could be configured.

The total number of ROs including both existing ROs and additional ROs TDMed is not expected to be more than a predetermined number, e.g. 8.

The additional number of ROs can be the same as the number of existing ROs configured.

Method 3 for PRACH Configuration with Frequency Domain Concatenation

Figure 14:
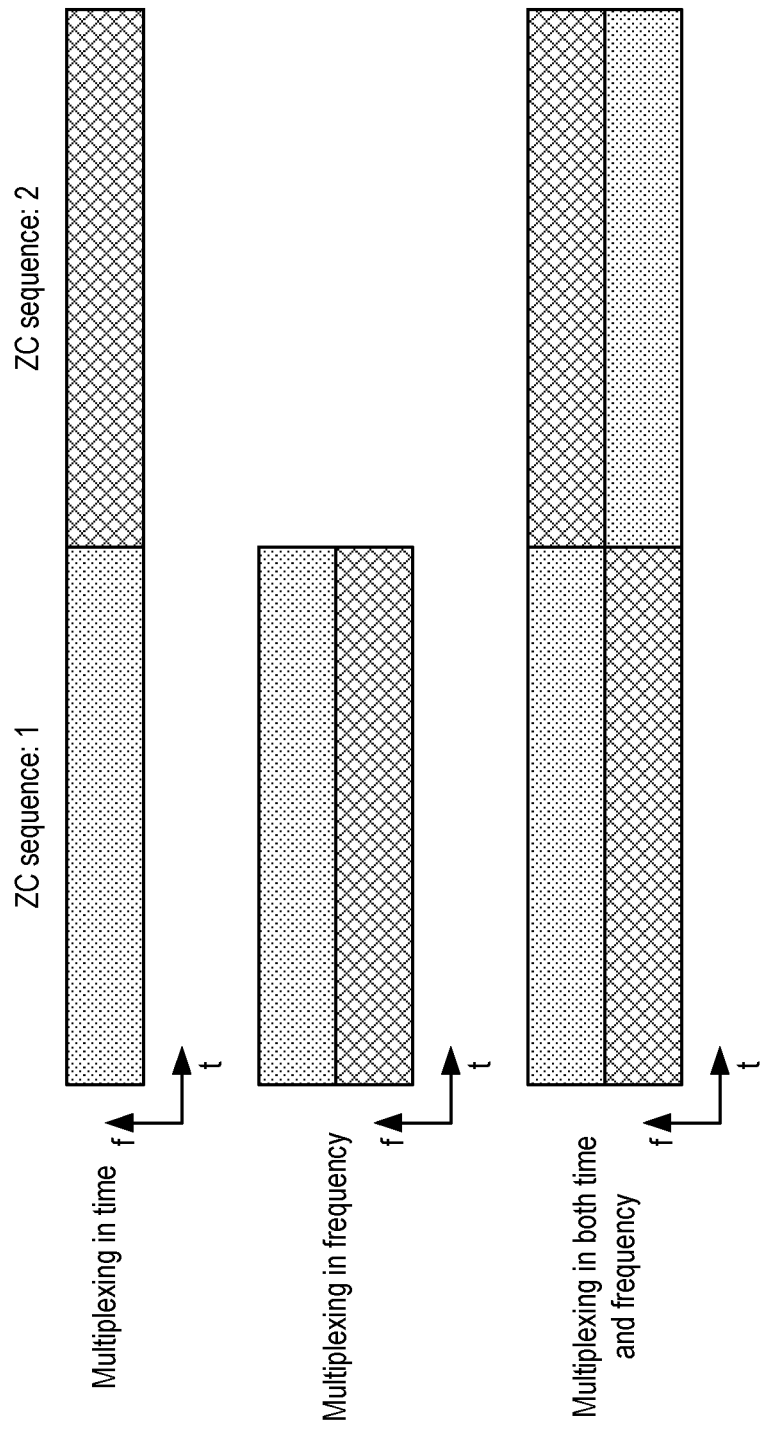
FIG. 14 illustrates time domain concatenation, frequency domain concatenation, and time/frequency domain concatenation of PRACH sequences.

The following method assumes that the NTN-specific PRACH formats are obtained by concatenating PRACH occasions in the frequency domain (e.g., as illustrated in FIG. 14). In this case, the legacy PRACH configuration index for determining PRACH format and time domain resource is applicable as-is for NTN-specific PRACH formats since concatenation is done in the frequency domain.

The following RRC parameter determines the number of contiguous ROs in the frequency domain.

msg1-FDM ENUMERATED {one, two, four, eight}

In one embodiment, a UE intending to perform NTN-specific RA using NTN-specific PRACH format selects the existing valid ROs in frequency domain according to Table 4. Specifically, If msg1-FDM is 8, within the PRACH Frequency Division Multiplexing (FDM) region consisting of 8 ROs, only 4 alternate ROs are considered valid. That is, the UE may choose the first, third, fifth, and seventh RO for counting RO. Then, the concatenated preamble consisting of 2 ZC sequences with different roots is transmitted as follows: the $1^{st}$ ZC sequence is transmitted in the first, third, fifth or seventh RO, and the $2^{nd}$ ZC sequence is transmitted in the second, fourth, sixth or eighth RO, respectively.

If msg1-FDM is 4, within the PRACH FDM region consisting of 4 ROs, only 2 alternate ROs are considered valid. That is, the UE may choose the first and third RO for counting RO. Then, the concatenated preamble consisting of two ZC sequences with different roots is transmitted as follows: the $1^{st}$ ZC sequence is transmitted in the first, or third, RO and the $2^{nd}$ ZC sequence is transmitted in the second, or fourth, RO, respectively.

If msg1-FDM is 2, within the PRACH FDM region consisting of 2 ROs, only 1 RO is considered valid. That is, the UE may choose only the first RO for counting RO. Then, the concatenated preamble consisting of 2 ZC sequences with different roots is transmitted as follows: the $1^{st}$ ZC sequence is transmitted in the first RO, and the $2^{nd}$ ZC sequence is transmitted in the second RO.

If msg1-FDM is 1, this can be used to signal to the UE that frequency domain concatenation of NTN-specific PRACH format is not allowed. The UE may then fallback to time domain concatenation if possible.

TABLE 4

Valid ROs in frequency domain for NTN-specific PRACH based on frequency domain concatenation

| msg1-FDM | # Valid ROs in frequency domain | Relative indices of valid RO within the FDM region |
|---|---|---|
| 1 | 0 | N/A |
| 2 | 1 | 0 |
| 4 | 2 | 0, 2 |
| 8 | 4 | 0, 2, 4, 6 |

Figure 24:
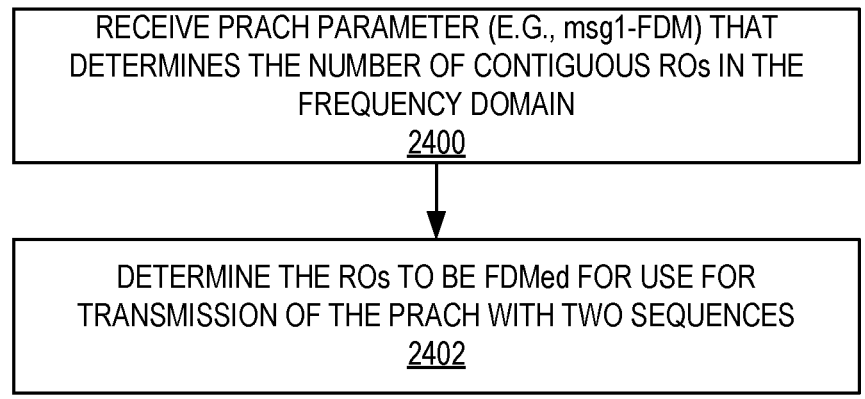
FIG. 24 illustrates an example embodiment in which a UE intending to perform NTN-specific RA using NTN-specific PRACH format selects the existing valid ROs in frequency domain according to Table 4.

One example of this embodiment is illustrated in FIG. 24. As illustrated, when determining the PRACH occasion(s) in step 1600, the UE 1512 receives a PRACH parameter (msg1-FDM) that determines the number of contiguous ROs in the frequency domain (step 2400). The UE 1512 determines the ROs to be FDMed for transmission of the PRACH with two sequences based on the received PRACH parameter (step 2402).

Figure 25:
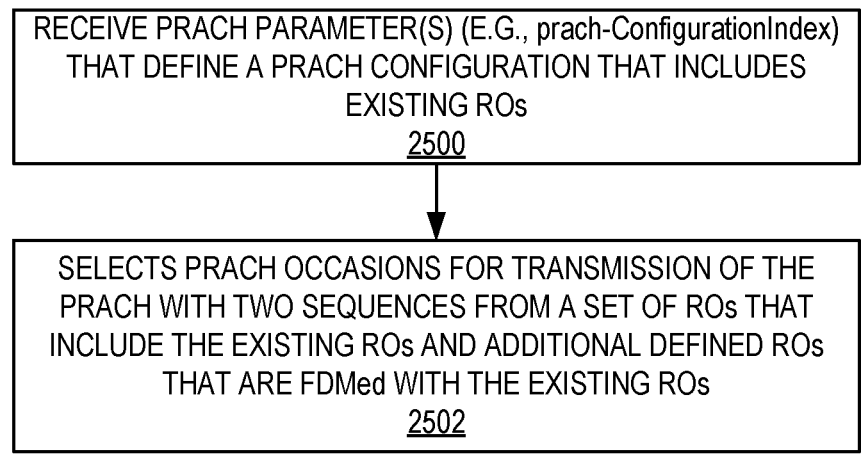
FIG. 25 illustrates definition of additional ROs in a frequency domain on top of existing ROs, where both the additional ROs and the existing ROs are Frequency Division Multiplexing (FDM) ed.

In another embodiment, some additional ROs in the frequency domain can be defined on top of the existing ROs, where the additionally defined ROs and the existing ROs are FDMed. This is illustrated in FIG. 25. As illustrated, when determining the PRACH occasions in step 1600, the UE 1512 receives one or more PRACH parameters that define a PRACH configuration that includes existing ROs in the frequency domain (step 2500). The UE 1512 selects the ROs to be FDMed for transmission of the PRACH with two sequences from a set of ROs including the existing ROs in the frequency domain and additional ROs that are FDMed with the existing ROs (step 2502).

The number of additional ROs and the starting PRB of the $1^{st}$ additional RO can be either RRC configured or derived from the number and the starting PRB of the existing ROs.

The first RO selected for transmitting the $1^{st}$ sequence can be based on the existing SSB to RO mapping and the SSB selected by UE for RA, and the $2^{nd}$ RO selected to transmit the $2^{nd}$ sequence can be either in a predetermined manner (e.g., a mapping between $1^{st}$ RO and $2^{nd}$ RO can be introduced in the specification) or configurable (e.g., the distance or the RO number difference between the $1^{st}$ RO and $2^{nd}$ RO can be configured by RRC signaling).

With this method, at least 2 ROs will be available for selecting RO pair for the 2 sequence transmission in NTN. The only difference between additional ROs and existing ROs is the frequency positions which is easy to be defined. And the $2^{nd}$ RO selection can be based on the $1^{st}$ RO selected which makes it possible to reuse the existing procedure of RA resource selection specified.

Figure 26:
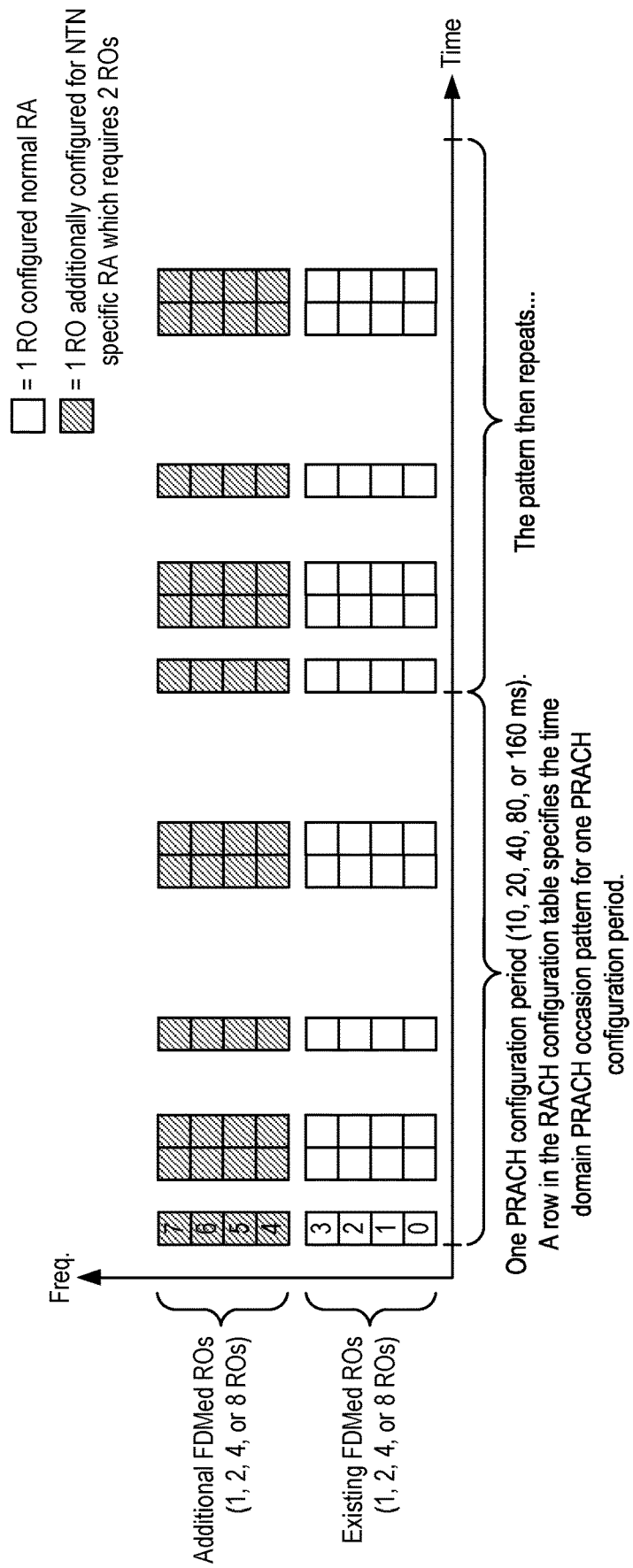
FIG. 26 illustrates an example of FDMed existing ROs and additional ROs for double sequence transmission.

FIG. 26 illustrates an example of FDMed existing ROs and additional ROs for double sequence transmission. In this example, the PRACH configuration signaling only defines 4 existing ROs FDMed, and additional 4 ROs are defined. The whole set of ROs are numbered from 0 to 7.

For the NTN-specific RA, the ROs to be used to transmit 2 sequences can be on the predetermined set of pairs of ROs, e.g. {RO0, RO4}, {RO1, RO5}, {RO2, RO6}, {RO3, RO7}. In another way, the RO pair can be determined by {ROx, ROy}, where y=(x+1)modN assuming 2 ROs with a RO number difference of 1, N is the total number of ROs in a considered time period. ROx is the $1^{st}$ RO selected by UE for RA depending on the SSB to RO mapping.

In a variant of this embodiment, the number of additional ROs depends on the number of existing ROs configured. One or more of the following rules can be introduced:
  The additional number of ROs can be zero when the existing number of ROs are already larger than a predetermined threshold.
    E.g., the threshold is 4 ROs, i.e. when the number of existing ROs is 8, no additional ROs are allowed considering that only {1, 2, 4, 8} ROs could be configured.
  The additional number of ROs can be the same as the number of existing ROs configured.
  The total number of ROs including both existing ROs and additional ROs FDMed is not expected to be more than a predetermined number, e.g. 8.

Method 4 for Frequency Domain Concatenation with Different Formats

Recall that a PRACH configuration indicates not only the time-domain instances of ROs but also the PRACH format that the UE should use for MSG1 transmission. The previous embodiment on frequency domain concatenation allowed using legacy PRACH configurations and possibly with additional ROs FDMed but with same PRACH format as existing ROs. This implicitly means that the PRACH format used in each RO should be the same. In this method, the UE can use different PRACH formats for the two preambles in the frequency domain ROs.

Figure 27:
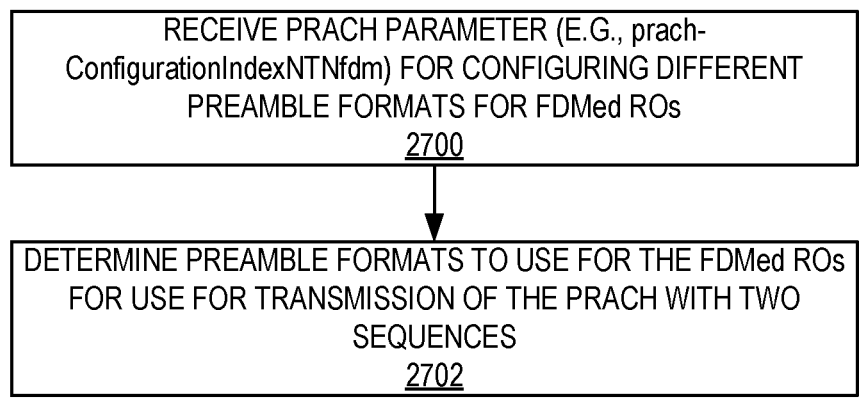
FIG. 27 illustrates an example embodiment in which a new or modified PRACH configuration table is defined and a separate RRC parameter prach-ConfigurationIndexNTNfdm is defined to allow configuring different PRACH formats for the two preambles with frequency domain concatenation.

In one embodiment, a new or modified PRACH configuration table is defined and a separate RRC parameter prach-ConfigurationIndexNTNfdm is defined to allow configuring different PRACH formats for the two preambles with frequency domain concatenation. This is illustrated in FIG. 27. As illustrated, when determining the PRACH occasion(s) in step 1600, the UE 1512 receives a new PRACH parameter (denoted here as prach-ConfigurationIndexNTNfdm) (step 2700) and determines the PRACH formats for the FDMed PRACH ROs to use for transmission of the PRACH with two sequences based on the received PRACH parameter and a new or modified PRACH configuration table (step 2702).

As an example, for FR1 paired spectrum scenario, a modified configuration table has the same time-domain instances of RO but has an additional column "Preamble format for $2^{nd}$ sequence" for the preamble format of the $2^{nd}$ sequence, as illustrated in Table 5. For example, if prach-ConfigurationIndexNTNfdm=28, the UE uses format 0 for the $1^{st}$ preamble and format 0 for the second preamble. Similarly, the table can be populated for other possible combinations of the two preambles.

Figure 28:
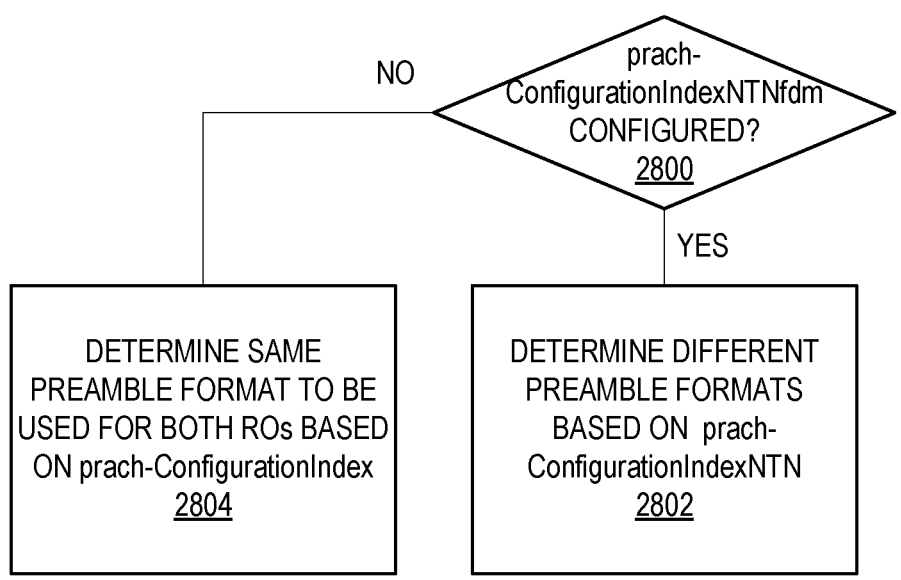
FIG. 28 illustrates an example embodiment in which the UE determines the PRACH preamble formats for the two preambles/sequences if frequency domain concatenation is to be used for NTN-specific random access.

In another embodiment, if frequency domain concatenation is to be used for NTN-specific random access, the UE determines the PRACH preamble formats for the two preambles/sequences as illustrated in FIG. 28 and described as follows:
  If the parameter prach-ConfigurationIndexNTNfdm is configured (step 2800, YES), the UE uses different preamble formats for the 2 preambles and learns the configuration, including the different preamble formats, from the corresponding PRACH configuration table.
  If the parameter prach-ConfigurationIndexNTNfdm is not configured (step 2800, NO), the UE uses the same preamble formats for the 2 preambles and learns the time-domain configuration of RO and preamble format using the existing PRACH configuration table.

TABLE 5

An illustration of the PRACH configuration table for frequency domain concatenation for FR1 paired spectrum

| PRACH Configuration Index | Preamble format | Preamble format for 2$^{nd}$ sequence | $n_{SFN}$ mod x = y | | Subframe number | Starting symbol | Number of PRACH slots within a subframe | $N_t^{RA,\ slot}$, number of time-domain PRACH occasions within a PRACH slot | $N_{dur}^{RA}$, PRACH duration |
|---|---|---|---|---|---|---|---|---|---|
| | | | x | y | | | | | |
| 0 | 0 | 0 | 16 | 1 | 1 | 0 | — | — | 0 |
| 1 | 0 | 0 | 16 | 1 | 4 | 0 | — | — | 0 |
| 2 | 0 | 0 | 16 | 1 | 7 | 0 | — | — | 0 |
| 3 | 0 | 0 | 16 | 1 | 9 | 0 | — | — | 0 |
| 4 | 0 | 0 | 8 | 1 | 1 | 0 | — | — | 0 |
| 5 | 0 | 0 | 8 | 1 | 4 | 0 | — | — | 0 |
| 6 | 0 | 0 | 8 | 1 | 7 | 0 | — | — | 0 |
| 7 | 0 | 0 | 8 | 1 | 9 | 0 | — | — | 0 |
| 8 | 0 | 0 | 4 | 1 | 1 | 0 | — | — | 0 |
| 9 | 0 | 0 | 4 | 1 | 4 | 0 | — | — | 0 |
| 10 | 0 | 0 | 4 | 1 | 7 | 0 | — | — | 0 |
| 11 | 0 | 0 | 4 | 1 | 9 | 0 | — | — | 0 |
| 12 | 0 | 0 | 2 | 1 | 1 | 0 | — | — | 0 |
| 13 | 0 | 0 | 2 | 1 | 4 | 0 | — | — | 0 |
| 14 | 0 | 0 | 2 | 1 | 7 | 0 | — | — | 0 |
| 15 | 0 | 0 | 2 | 1 | 9 | 0 | — | — | 0 |
| 16 | 0 | 0 | 1 | 0 | 1 | 0 | — | — | 0 |
| 17 | 0 | 0 | 1 | 0 | 4 | 0 | — | — | 0 |
| 18 | 0 | 0 | 1 | 0 | 7 | 0 | — | — | 0 |
| 19 | 0 | 0 | 1 | 0 | 1, 6 | 0 | — | — | 0 |
| 20 | 0 | 0 | 1 | 0 | 2, 7 | 0 | — | — | 0 |
| 21 | 0 | 0 | 1 | 0 | 3, 8 | 0 | — | — | 0 |
| 22 | 0 | 0 | 1 | 0 | 1, 4, 7 | 0 | — | — | 0 |
| 23 | 0 | 0 | 1 | 0 | 2, 5, 8 | 0 | — | — | 0 |
| 24 | 0 | 0 | 1 | 0 | 3, 6, 9 | 0 | — | — | 0 |
| 25 | 0 | 0 | 1 | 0 | 0, 2, 4, 6, 8 | 0 | — | — | 0 |
| 26 | 0 | 0 | 1 | 0 | 1, 3, 5, 7, 9 | 0 | — | — | 0 |
| 27 | 0 | 0 | 1 | 0 | 0, 1, 2, 3, 4, 5, 6, 7, 8, 9 | 0 | — | — | 0 |
| 28 | 1 | 0 | 16 | 1 | 1 | 0 | — | — | 0 |
| 29 | 1 | 0 | 16 | 1 | 4 | 0 | — | — | 0 |
| 30 | 1 | 0 | 16 | 1 | 7 | 0 | — | — | 0 |
| 31 | 1 | 0 | 16 | 1 | 9 | 0 | — | — | 0 |
| 32 | 1 | 0 | 8 | 1 | 1 | 0 | — | — | 0 |
| 33 | 1 | 0 | 8 | 1 | 4 | 0 | — | — | 0 |
| 34 | 1 | 0 | 8 | 1 | 7 | 0 | — | — | 0 |
| 35 | 1 | 0 | 8 | 1 | 9 | 0 | — | — | 0 |
| 36 | 1 | 0 | 4 | 1 | 1 | 0 | — | — | 0 |
| 37 | 1 | 0 | 4 | 1 | 4 | 0 | — | — | 0 |
| 38 | 1 | 0 | 4 | 1 | 7 | 0 | — | — | 0 |
| 39 | 1 | 0 | 4 | 1 | 9 | 0 | — | — | 0 |
| 40 | 1 | 0 | 2 | 1 | 1 | 0 | — | — | 0 |
| 41 | 1 | 0 | 2 | 1 | 4 | 0 | — | — | 0 |
| 42 | 1 | 0 | 2 | 1 | 7 | 0 | — | — | 0 |
| 43 | 1 | 0 | 2 | 1 | 9 | 0 | — | — | 0 |
| 44 | 1 | 0 | 1 | 0 | 1 | 0 | — | — | 0 |
| 45 | 1 | 0 | 1 | 0 | 4 | 0 | — | — | 0 |
| 46 | 1 | 0 | 1 | 0 | 7 | 0 | — | — | 0 |
| 47 | 1 | 0 | 1 | 0 | 1, 6 | 0 | — | — | 0 |
| 48 | 1 | 0 | 1 | 0 | 2, 7 | 0 | — | — | 0 |
| 49 | 1 | 0 | 1 | 0 | 3, 8 | 0 | — | — | 0 |
| 50 | 1 | 0 | 1 | 0 | 1, 4, 7 | 0 | — | — | 0 |
| 51 | 1 | 0 | 1 | 0 | 2, 5, 8 | 0 | — | — | 0 |
| 52 | 1 | 0 | 1 | 0 | 3, 6, 9 | 0 | — | — | 0 |

Method 5 for Joint Transmission of 2 Preambles

Figure 29:
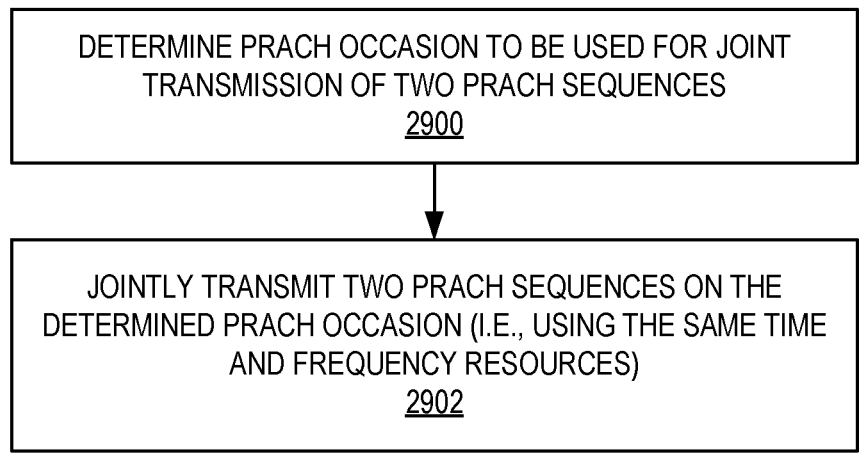
FIG. 29 illustrates the operation of a UE in accordance with an example of Method 5.

In one embodiment, both ZC sequences of the NTN-specific PRACH are transmitted jointly using the same time/frequency resources. In this case, the existing PRACH configurations can be reused. FIG. 29 illustrates the operation of a UE 1512 in accordance with an example of Method 5. As illustrated, the UE 1512 determines (e.g., selects) a PRACH occasion for joint transmission of a PRACH with two sequences (e.g., two ZC-sequences), e.g., in NTN (step 2900). The UE 1512 then jointly transmits the PRACH with two sequences on the determined PRACH occasion (i.e., using the same time/frequency resources) (step 2902).

Other General Methods (not Only for the Solution for PRACH Format with 2 ZC Sequences) on NTN-Specific PRACH Configurations In one embodiment, a guard band is configured between the PRACH occasions for NTN-specific RA. This can mitigate the interference between PRACH transmissions in different PRACH occasions frequency multiplexed in NTN.

Here, the guard band can be configured by RRC so that different values can be configured depending on the use cases and services provided. The guard band can also be predetermined depending on different frequency band and/or use cases, e.g. Geostationary Earth Orbit (GEO)/Low Earth Orbit (LEO) cases.

As an example, the following 2 parameters can be configured in System Information Block 1 (SIB1) for the guard band between ROs for 2-step RACH and 4-step RACH respectively for NTN-specific RA. The guard band in the example can be 0 or 1 PRB.

| | |
|---|---|
| guardBandMsgA-PRACH | INTEGER (0..1), |
| guardBandMsg1-PRACH | INTEGER (0..1), | guardBandMsgA-PRACH
PRB-level guard band between FDMed PRACH occasions in 2-step RACH.
guardBandMsg1-PRACH
PRB-level guard band between FDMed PRACH occasions in 4-step RACH.

In another embodiment, the PRACH occasions for NTN-specific RA can be a subset of the ROs configured for normal RA. This can make sparse ROs for NTN-specific RA which makes it possible to avoid possible PRACH receiving window overlapping issue between different ROs in time domain.

Here, the subset of ROs can be derived based on one or more of the following methods:
  The subset of ROs is configured by RRC signaling, e.g. in SIB1.
  The subset of ROs can be indicated in the PRACH configuration table explicitly
  The subset of ROs is predetermined.

Figure 30:
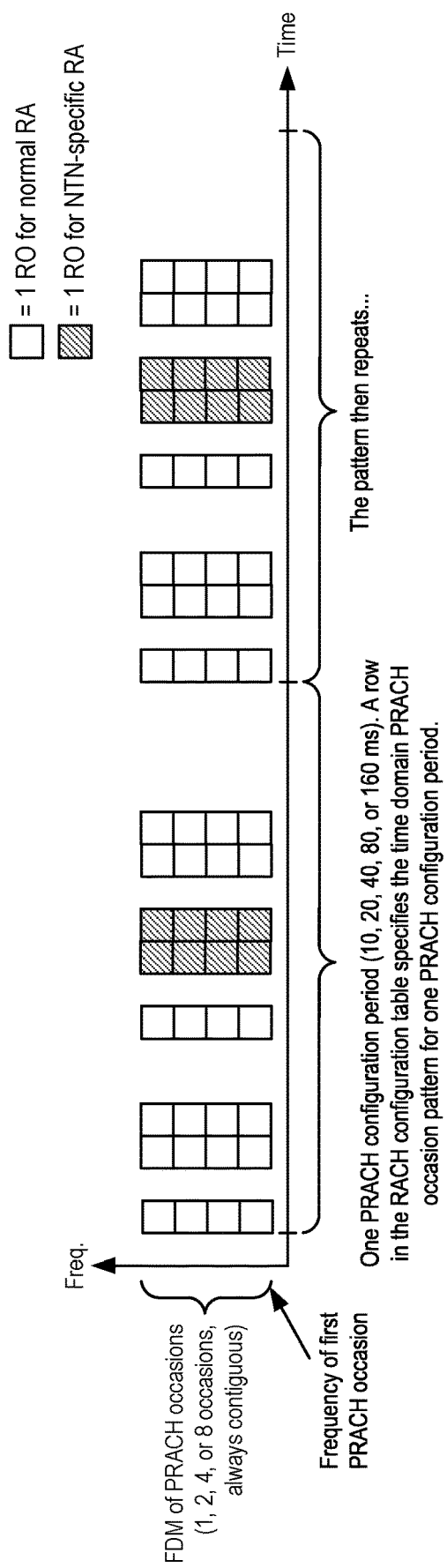
FIG. 30 illustrates an example embodiment in which the PRACH occasions for NTN-specific RA can be TDMed with the ROs configured for normal RA.

In another embodiment, the PRACH occasions for NTN-specific RA can be TDMed with the ROs configured for normal RA. As illustrated in FIG. 30, white ROs are for normal RA while shaded ROs are for NTN-specific RA due to large frequency and/or timing frequency error that need to be estimated.

In another embodiment, the PRACH occasions for NTN-specific RA can be FDMed with the ROs configured for normal RA.

Figure 31:
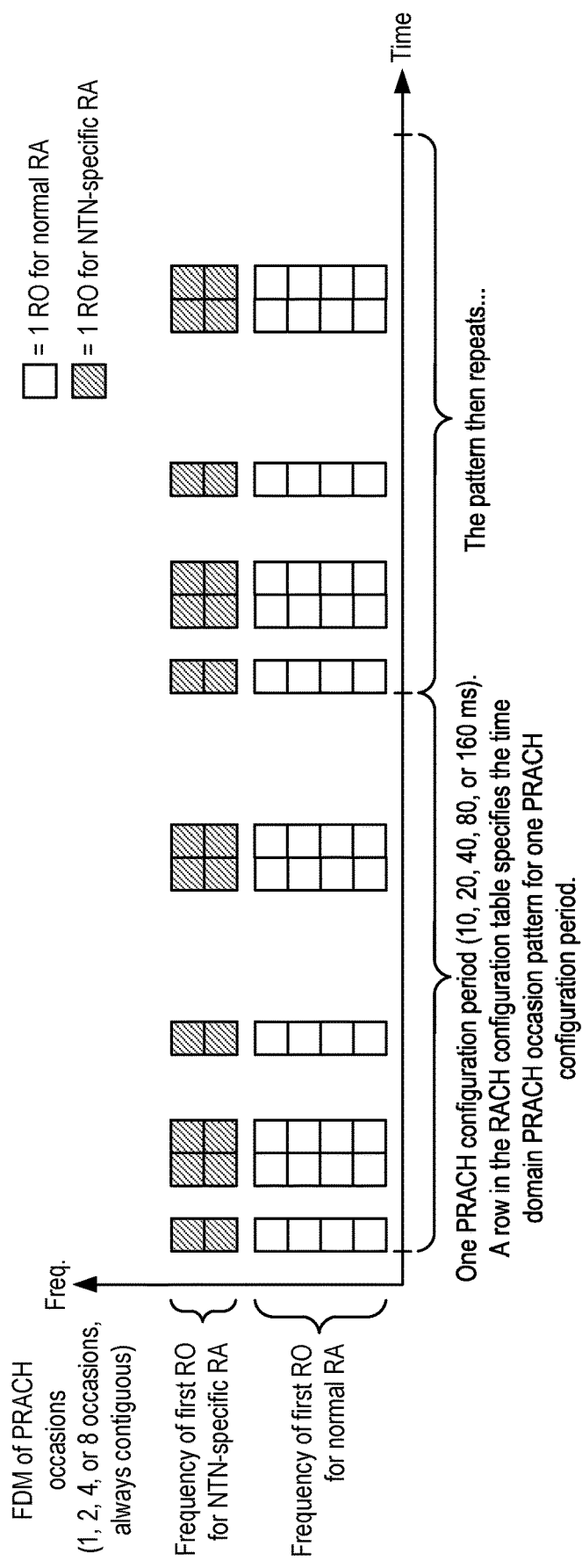
FIG. 31 illustrates an example embodiment in which the PRACH occasions for NTN-specific RA can be FDMed with the ROs configured for normal RA.

As illustrated in FIG. 31, white ROs are for normal RA while gray ROs are for NTN-specific RA due to large frequency and/or timing frequency error that need to be estimated.

In a variant of above embodiment, the PRACH occasions for NTN-specific RA can be FDMed with the ROs configured for normal RA and the 2 set of ROs are consecutive.

Figure 32:
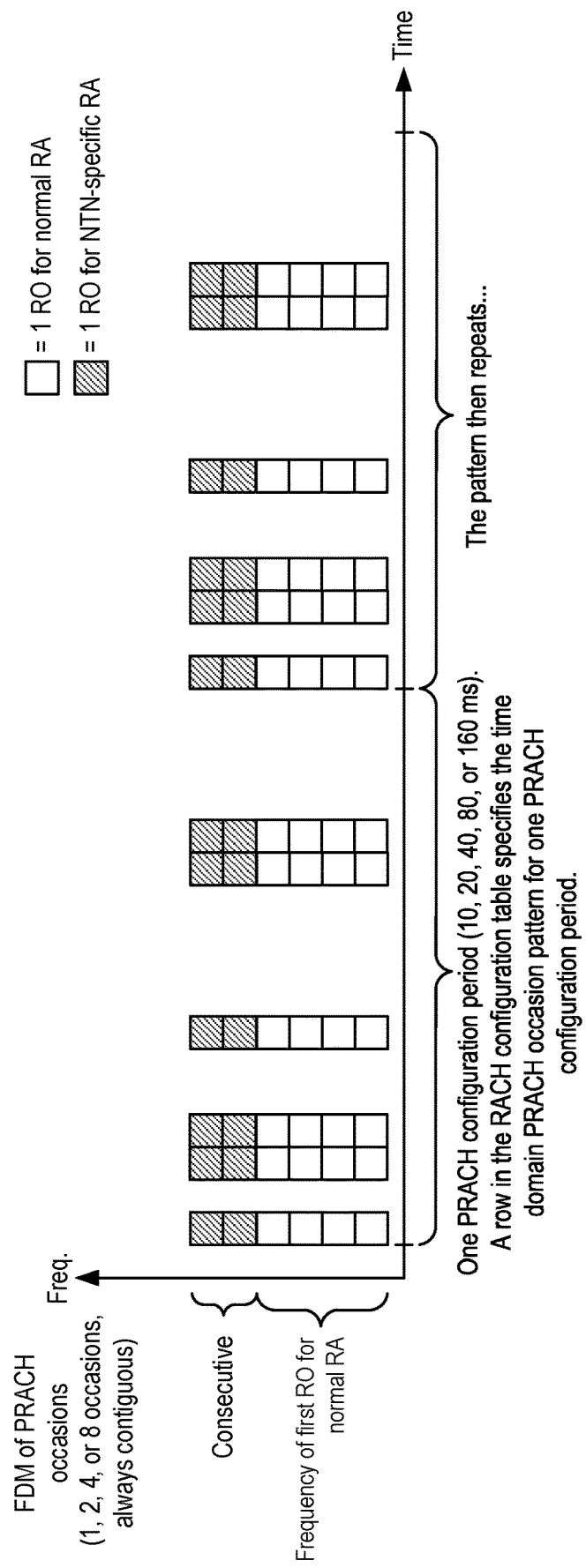
FIG. 32 illustrates an example embodiment in which the PRACH occasions for NTN-specific RA can be FDMed with the ROs configured for normal RA and the 2 set of ROs are consecutive.

As illustrated in FIG. 32, white ROs are for normal RA while shaded ROs are for NTN-specific RA due to large frequency and/or timing frequency error that need to be estimated, and they are consecutive in frequency domain.

Figure 33:
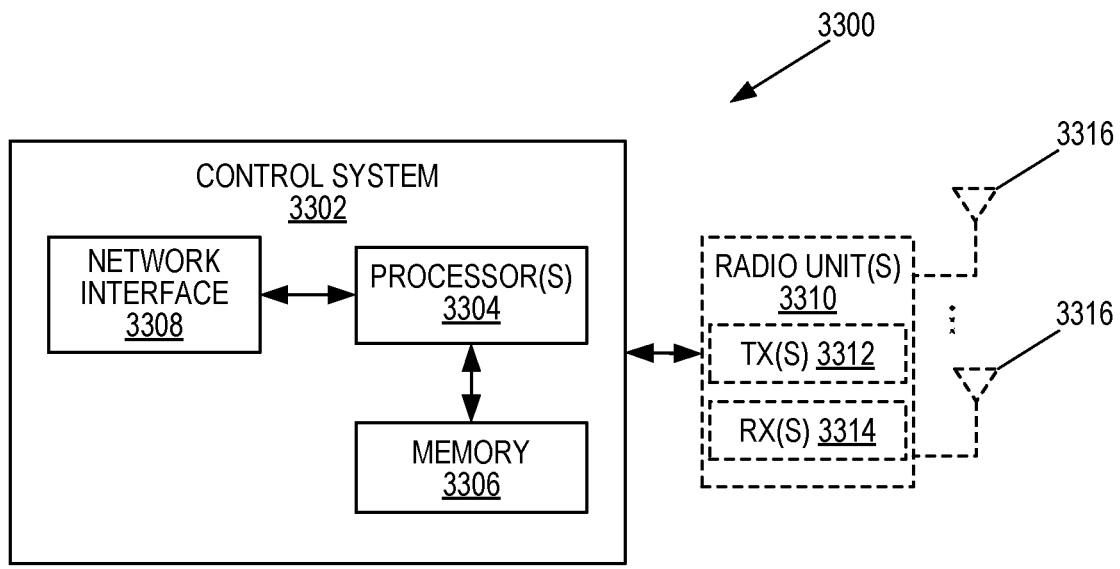
FIG. 33 is a schematic block diagram of a radio access node according to some embodiments of the present disclosure.

FIG. 33 is a schematic block diagram of a radio access node 3300 according to some embodiments of the present disclosure. Optional features are represented by dashed boxes. The radio access node 3300 may be, for example, the radio access node 1502 such as, e.g., a base station or non-terrestrial radio access node that operates in accordance with any of the embodiments described herein. As illustrated, the radio access node 3300 includes a control system 3302 that includes one or more processors 3304 (e.g., Central Processing Units (CPUs), Application Specific Integrated Circuits (ASICs), Field Programmable Gate Arrays (FPGAs), and/or the like), memory 3306, and a network interface 3308. The one or more processors 3304 are also referred to herein as processing circuitry. In addition, the radio access node 3300 may include one or more radio units 3310 that each includes one or more transmitters 3312 and one or more receivers 3314 coupled to one or more antennas 3316. The radio units 3310 may be referred to or be part of radio interface circuitry. In some embodiments, the radio unit(s) 3310 is external to the control system 3302 and connected to the control system 3302 via, e.g., a wired connection (e.g., an optical cable). However, in some other, embodiments, the radio unit(s) 3310 and potentially the antenna(s) 3316 are integrated together with the control system 3302. The one or more processors 3304 operate to provide one or more functions of a radio access node 3300 as described herein. In some embodiments, the function(s) are implemented in software that is stored, e.g., in the memory 3306 and executed by the one or more processors 3304.

Figure 34:
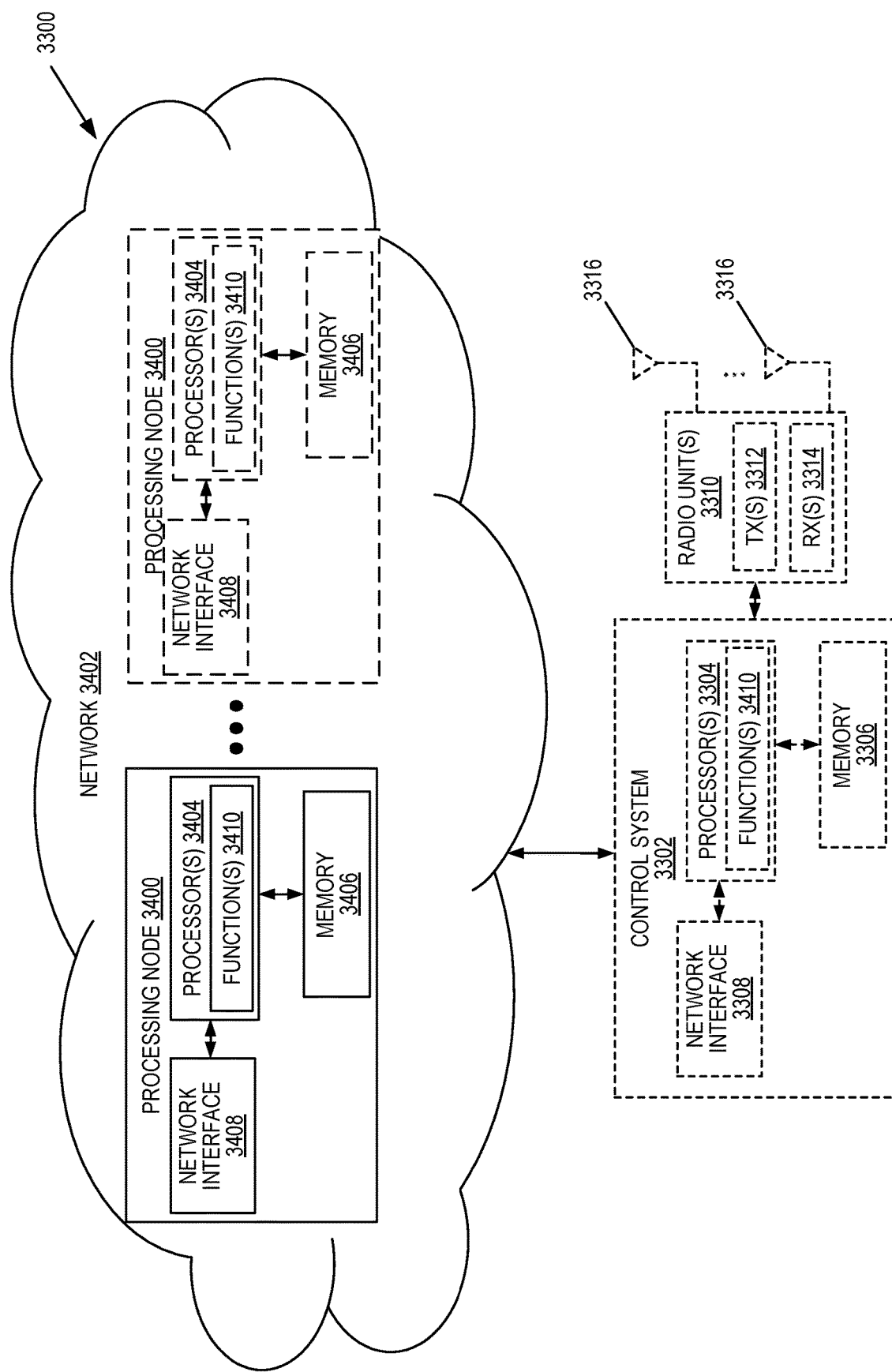
FIG. 34 is a schematic block diagram that illustrates a virtualized embodiment of the radio access node according to some embodiments of the present disclosure.

FIG. 34 is a schematic block diagram that illustrates a virtualized embodiment of the radio access node 3300 according to some embodiments of the present disclosure. This discussion is equally applicable to other types of network nodes. Further, other types of network nodes may have similar virtualized architectures. Again, optional features are represented by dashed boxes.

As used herein, a "virtualized" radio access node is an implementation of the radio access node 3300 in which at least a portion of the functionality of the radio access node 3300 is implemented as a virtual component(s) (e.g., via a virtual machine(s) executing on a physical processing node(s) in a network(s)). As illustrated, in this example, the radio access node 3300 may include the control system 3302 and/or the one or more radio units 3310, as described above. The control system 3302 may be connected to the radio unit(s) 3310 via, for example, an optical cable or the like. The radio access node 3300 includes one or more processing nodes 3400 coupled to or included as part of a network(s) 3402. If present, the control system 3302 or the radio unit(s) are connected to the processing node(s) 3400 via the network 3402. Each processing node 3400 includes one or more processors 3404 (e.g., CPUs, ASICs, FPGAS, and/or the like), memory 3406, and a network interface 3408.

In this example, functions 3410 of the radio access node 3300 described herein are implemented at the one or more processing nodes 3400 or distributed across the one or more processing nodes 3400 and the control system 3302 and/or the radio unit(s) 3310 in any desired manner. In some particular embodiments, some or all of the functions 3410 of the radio access node 3300 described herein are implemented as virtual components executed by one or more virtual machines implemented in a virtual environment(s) hosted by the processing node(s) 3400. As will be appreciated by one of ordinary skill in the art, additional signaling or communication between the processing node(s) 3400 and the control system 3302 is used in order to carry out at least some of the desired functions 3410. Notably, in some embodiments, the control system 3302 may not be included, in which case the radio unit(s) 3310 communicate directly with the processing node(s) 3400 via an appropriate network interface(s).

In some embodiments, a computer program including instructions which, when executed by at least one processor, causes the at least one processor to carry out the functionality of radio access node 3300 or a node (e.g., a processing node 3400) implementing one or more of the functions 3410 of the radio access node 3300 in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 35:
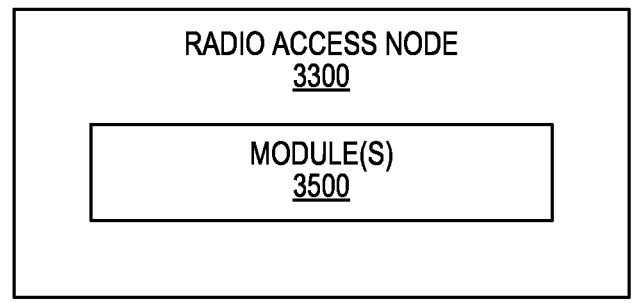
FIG. 35 is a schematic block diagram of the radio access node according to some other embodiments of the present disclosure.

FIG. 35 is a schematic block diagram of the radio access node 3300 according to some other embodiments of the present disclosure. The radio access node 3300 includes one or more modules 3500, each of which is implemented in software. The module(s) 3500 provide the functionality of the radio access node 3300 described herein. This discussion is equally applicable to the processing node 3400 of FIG. 34 where the modules 3500 may be implemented at one of the processing nodes 3400 or distributed across multiple processing nodes 3400 and/or distributed across the processing node(s) 3400 and the control system 3302.

Figure 36:
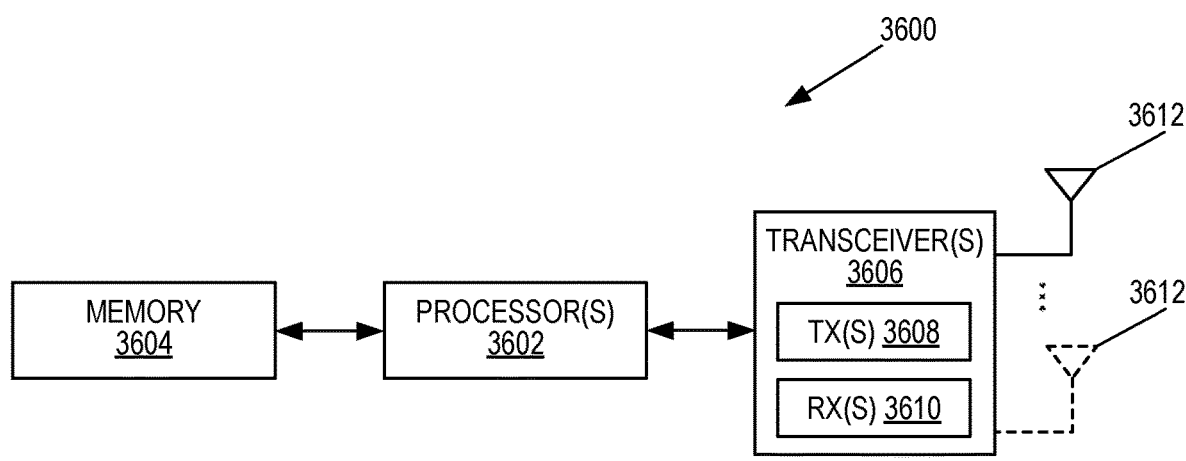
FIG. 36 is a schematic block diagram of a wireless communication device (e.g., a UE) according to some embodiments of the present disclosure.

FIG. 36 is a schematic block diagram of a wireless communication device 3600 (e.g., a UE 1512) according to some embodiments of the present disclosure. As illustrated, the wireless communication device 3600 includes one or more processors 3602 (e.g., CPUs, ASICs, FPGAs, and/or the like), memory 3604, and one or more transceivers 3606 each including one or more transmitters 3608 and one or more receivers 3610 coupled to one or more antennas 3612. The transceiver(s) 3606 includes radio-front end circuitry connected to the antenna(s) 3612 that is configured to condition signals communicated between the antenna(s) 3612 and the processor(s) 3602, as will be appreciated by on of ordinary skill in the art. The processors 3602 are also referred to herein as processing circuitry. The transceivers 3606 are also referred to herein as radio circuitry. In some embodiments, the functionality of the wireless communication device 3600 described above (e.g., the functionality of a UE described above) may be fully or partially implemented in software that is, e.g., stored in the memory 3604 and executed by the processor(s) 3602. Note that the wireless communication device 3600 may include additional components not illustrated in FIG. 36 such as, e.g., one or more user interface components (e.g., an input/output interface including a display, buttons, a touch screen, a microphone, a speaker(s), and/or the like and/or any other components for allowing input of information into the wireless communication device 3600 and/or allowing output of information from the wireless communication device 3600), a power supply (e.g., a battery and associated power circuitry), etc.

In some embodiments, a computer program including instructions which, when executed by at least one processor, causes the at least one processor to carry out the functionality of the wireless communication device 3600 according to any of the embodiments described herein (e.g., the functionality of a UE described above) is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 37:
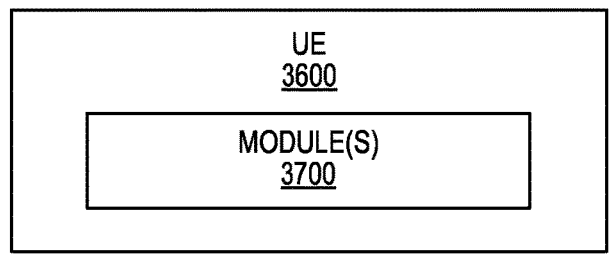
FIG. 37 is a schematic block diagram of the wireless communication device 3600 according to some other embodiments of the present disclosure.

FIG. 37 is a schematic block diagram of the wireless communication device 3600 according to some other embodiments of the present disclosure. The wireless communication device 3600 includes one or more modules 3700, each of which is implemented in software. The module(s) 3700 provide the functionality of the wireless communication device 3600 described herein.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

EMBODIMENTS

1. A method performed by a wireless communication device (1512) for random access, the method comprising:
determining one or more random access occasions for transmission of a random access channel; and
transmitting the random access channel on the determined one or more random access occasions.

2. The method of embodiment 1 wherein:
determining the one or more random access occasions for transmission of a random access channel comprises determining (1600; 2900) the one or more random access occasions for transmission of the random access channel with two (or more) sequences (i.e., two (or more) random access preambles); and
transmitting the random access channel comprises transmitting (1602; 2900) the random access channel with the two (or more) sequences on the determined one or more random access occasions.

3. The method of embodiment 2 wherein determining (1600; 2900) the one or more random access occasions for transmission of the random access channel with two (or more) sequences comprises determining (1600) two random access occasions for transmission of the random access channel with two sequences.

4. The method of embodiment 3 wherein the two random access occasions are concatenated in the time-domain.

5. The method of embodiment 4 wherein determining (1600) two random access occasions for transmission of the random access channel with two sequences comprises:
receiving (1700; 1900) a random access parameter that indicates one of a plurality of defined random access configurations defined for transmission of a random access channel with two sequences; and
determining (1702; 1902) the two random access occasions based on the received random access parameter.

6. The method of embodiment 5 wherein the plurality of defined random access configurations defined for transmission of a random access channel with two sequences is comprised in a table, and the random access parameter is an index to the table.

7. The method of embodiment 6 wherein the table is a table defined for Non-Terrestrial Network, NTN, specific random access.

8. The method of embodiment 7 wherein the index is an index defined specifically for NTN specific random access.

9. The method of embodiment 7 wherein the index is an index defined for both normal random access and NTN specific random access.

10. The method of embodiment 4 wherein determining (1600) two random access occasions for transmission of the random access channel with two sequences comprises:
    determining (1802; YES) that a random access parameter that indicates one of a plurality of defined random access configurations defined for transmission of a random access channel with two sequences has been configured for the wireless communication device (1512); and
    determining (1806) the two random access occasions and a random access preamble format for the two sequences based on the random access parameter responsive to determining (1802; YES) that the random access parameter has been configured for the wireless communication device (1512).

11. The method of embodiment 4 wherein determining (1600) two random access occasions for transmission of the random access channel with two sequences comprises indirectly obtaining a new Physical Random Access Channel, PRACH, configuration comprising the two random access occasions from a legacy PRACH configuration.

12. The method of embodiment 4 wherein determining (1600) two random access occasions for transmission of the random access channel with two sequences comprises:
    receiving (2000) a random access parameter that defines a legacy random access configuration; and
    reinterpreting (2002) the legacy random access configuration to infer a new random access configuration that comprises the two random access occasions for transmission of the random access channel with two sequences.

13. The method of embodiment 12 wherein reinterpreting (2002) the legacy random access configuration to infer the new random access configuration that comprises the two random access occasions for transmission of the random access channel with two sequences comprises reinterpreting a New Radio, NR, Physical Random Access Channel, PRACH, configuration for transmission of a format 1 or format 2 preamble as a NR PRACH configuration for transmission of the two sequences as two NR PRACH format 0 preambles.

14. The method of embodiment 12 wherein reinterpreting (2002) the legacy random access configuration to infer the new random access configuration that comprises the two random access occasions for transmission of the random access channel with two sequences comprises reinterpreting a New Radio, NR, Physical Random Access Channel, PRACH, configuration for transmission of a format 3 preamble as a NR PRACH configuration for transmission of the two sequences as a NR PRACH format 0 preamble followed by a NR PRACH format 1 preamble.

15. The method of embodiment 4 wherein determining (1600) two random access occasions for transmission of the random access channel with two sequences comprises:
    receiving (2100) a random access parameter that indicates a random access configuration; and
    selecting (2102) two consecutive random access occasions from a set of random access occasions defined by the random access configuration as the two random access occasions for transmission of the random access channel with two sequences.

16. The method of embodiment 4 wherein determining (1600) two random access occasions for transmission of the random access channel with two sequences comprises:
    receiving (2200) a random access parameter that indicates a random access configuration, the random access configuration defining one or more existing random access occasions; and
    selecting (2202) the two or more random access occasions for transmission of the random access channel with two sequences from among a set of random access occasions that comprises the one or more existing random access occasions and one or more additional random access occasions that are time division multiplexed with the one or more existing random access occasions.

17. The method of embodiment 3 wherein the two random access occasions are concatenated in the frequency-domain.

18. The method of embodiment 17 wherein determining (1600) two random access occasions for transmission of the random access channel with two sequences comprises:
    receiving (2400) a random access parameter that determines a number of contiguous random access occasions in the frequency-domain; and
    determining (2402) the two random access occasions for transmission of the random access channel with two sequences based on the random access parameter.

19. The method of embodiment 17 wherein determining (1600) two random access occasions for transmission of the random access channel with two sequences comprises:
    receiving (2500) a random access parameter that indicates a random access configuration, the random access configuration defining one or more existing random access occasions; and
    selecting (2502) the two or more random access occasions for transmission of the random access channel with two sequences from among a set of random access occasions that comprises the one or more existing random access occasions and one or more additional random access occasions that are frequency division multiplexed with the one or more existing random access occasions.

20. The method of embodiment 17 wherein determining (1600) two random access occasions for transmission of the random access channel with two sequences comprises:
    receiving (2700) a random access parameter that indicates a random access configuration from among a plurality of random access configurations that comprise random access occasions that are frequency division multiplexed; and
    determining (2702) one of the plurality of random access configurations based on the random access parameter.

21. The method of embodiment 2 wherein determining (1600; 2900) the one or more random access occasions for transmission of the random access channel with two (or more) sequences comprises determining (2900) a random access occasion for joint transmission of the two sequences, and transmitting (1602; 2900) the random access channel comprises jointly transmitting (2900) the two sequences in the determined random access occasion on the same time and frequency resources.

22. The method of any of embodiments 1 to 20 wherein a guard band is configured between the random access occasions.

23. The method of any of embodiments 1 to 20 and 22 wherein the determined random access occasions are a subset of a set of random access occasions configured for normal random access.

24. The method of any of embodiments 1 to 20, 22, and 23 wherein the determined random access occasions are time division multiplexed with random access occasions configured for normal random access.

25. The method of any of embodiments 1 to 20, 22, and 23 wherein the determined random access occasions are frequency division multiplexed with random access occasions configured for normal random access.

26. The method of embodiment 25 wherein the determined random access occasions are frequency division multiplexed and are consecutive.

27. A wireless communication device (1512) for random access, the wireless communication device (1512) adapted to perform the method of any of embodiments 1 to 26.

28. A method performed by radio access node (1502) for configuring a wireless communication device (1512) for random access, the method comprising: configuring the wireless communication device (1512) with one or more random access occasions for transmission of a random access channel with two (or more) sequences (i.e., two (or more) random access preambles).

29. The method of embodiment 28 further comprising receiving a random access channel with two (or more) sequences on the configured one or more random access occasions.

30. A radio access node (1502) for configuring a wireless communication device (1512) for random access, the radio access node (1502) adapted to perform the method of embodiment 28 or 29.

At least some of the following abbreviations may be used in this disclosure. If there is an inconsistency between abbreviations, preference should be given to how it is used above. If listed multiple times below, the first listing should be preferred over any subsequent listing(s).

3GPP Third Generation Partnership Project
5G Fifth Generation
5GC Fifth Generation Core
5GS Fifth Generation System
AMF Access and Mobility Function
AN Access Network
ASIC Application Specific Integrated Circuit
AUSF Authentication Server Function
BS Base Station
BWP Bandwidth Part
CB Code Block
CBRA Contention-Based Random Access
CCCH Common Control Channel
CE Control Element
CFRA Contention-Free Random Access
CPU Central Processing Unit
dB Decibels
DL Downlink
DMRS Demodulation Reference Symbol
DSP Digital Signal Processor
eMBB Enhanced Mobile Broadband
eNB Enhanced or Evolved Node B
EPC Evolved Packet Core
EPS Evolved Packet System
FDM Frequency Division Multiplexing
FPGA Field Programmable Gate Array
FR1 Frequency Range 1
FR2 Frequency Range 2
GEO Geostationary Earth Orbit
GHZ Gigahertz
gNB New Radio Base Station
gNB-CU New Radio Base Station Central Unit
gNB-DU New Radio Base Station Distributed Unit
GNSS Global Navigation Satellite System
HSS Home Subscriber Server
ID Identifier
IoT Internet of Things
LEO Low Earth Orbit
LOS Line-of-Sight
LTE Long Term Evolution
LTE-M Long Term Evolution for Machine Type Communication
MAC Medium Access Control
MBB Mobile Broadband
MEO Medium Earth Orbit
MIB Master Information Block
MME Mobility Management Entity
mMTC Massive Machine Type Communication
MsgA Message
MTC Machine Type Communication
NEF Network Exposure Function
NB-IoT Narrowband Internet of Things
NF Network Function
NG-RAN Next Generation Radio Access Network
NR New Radio
NRF Network Function Repository Function
NSSF Network Slice Selection Function
NTN Non-terrestrial Network
OFDM Orthogonal Frequency Division Multiplexing
PBCH Physical Broadcast Channel
PC Personal Computer
PCMAX Maximum Power
PCF Policy Control Function
PDSCH Physical Downlink Shared Channel
P-GW Packet Data Network Gateway
PRACH Physical Random Access Channel
PRB Physical Resource Block
PSS Primary Synchronization Signal
PUSCH Physical Uplink Shared Channel
RA Random Access
RACH Random Access Channel
RAR Random-Access Response
RO Random Access Channel Occasion
RAM Random Access Memory
RAN Radio Access Network
ROM Read Only Memory
RRC Radio Resource Control
RRH Remote Radio Head
RTT Round Trip Time
SCEF Service Capability Exposure Function
SDU Service Data Unit
SIB1 System Information Block 1
SMF Session Management Function
SS Synchronization Signals
SSB Synchronization Signal Block
SSS Secondary Synchronization Signal
TDD Time Division Duplexing
TDM Time Division Multiplexing
UDM Unified Data Management
UE User Equipment
UL Uplink
UPF User Plane Function
URLLC Ultra-reliable and Low Latency Communication
ZC Zadoff-Chu Those skilled in the art will recognize improvements and modifications to the embodiments of the present disclosure.

All such improvements and modifications are considered within the scope of the concepts disclosed herein.

The invention claimed is:

1. A method performed by a wireless communication device for random access, the method comprising:
    determining one or more random access occasions for transmission of a random access channel, determining the one or more random access occasions for transmission of a random access channel comprising determining the one or more random access occasions for transmission of the random access channel with two or more sequences, determining the one or more random access occasions for transmission of the random access channel with two or more sequences comprising determining two random access occasions for transmission of the random access channel with two sequences, determining two random access occasions for transmission of the random access channel with two sequences comprising receiving a random access parameter that indicates one of a plurality of defined random access configurations defined for transmission of a random access channel with two sequences and determining the two random access occasions based on the received random access parameter, the two random access occasions concatenated in the time-domain and the plurality of defined random access configurations defined for transmission of a random access channel with two sequences comprised in a table, the table a table defined for Non-Terrestrial Network, NTN, specific random access, and the random access parameter an index to the table; and
    transmitting the random access channel on the determined one or more random access occasions, transmitting the random access channel comprising transmitting the random access channel with the two or more sequences on the determined one or more random access occasions.

2. The method of claim 1, wherein one of:
    the index is an index defined specifically for NTN specific random access; and
    the index is an index defined for both normal random access and NTN specific random access.

3. The method of claim 1, wherein determining two random access occasions for transmission of the random access channel with two sequences comprises:
    determining that a random access parameter that indicates one of a plurality of defined random access configurations defined for transmission of a random access channel with two sequences has been configured for the wireless communication device; and
    determining the two random access occasions and a random access preamble format for the two sequences based on the random access parameter responsive to determining that the random access parameter has been configured for the wireless communication device.

4. The method of claim 1, wherein determining two random access occasions for transmission of the random access channel with two sequences comprises indirectly obtaining a new Physical Random Access Channel, PRACH, configuration comprising the two random access occasions from a legacy PRACH configuration.

5. The method of claim 1, wherein determining two random access occasions for transmission of the random access channel with two sequences comprises:
    receiving a random access parameter that defines a legacy random access configuration; and
    reinterpreting the legacy random access configuration to infer a new random access configuration that comprises the two random access occasions for transmission of the random access channel with two sequences.

6. The method of claim 5, wherein reinterpreting the legacy random access configuration to infer the new random access configuration that comprises the two random access occasions for transmission of the random access channel with two sequences comprises reinterpreting a New Radio, NR, Physical Random Access Channel, PRACH, configuration for transmission of a format 1 or format 2 preamble as a NR PRACH configuration for transmission of the two sequences as two NR PRACH format 0 preambles.

7. The method of claim 5, wherein reinterpreting the legacy random access configuration to infer the new random access configuration that comprises the two random access occasions for transmission of the random access channel with two sequences comprises reinterpreting a New Radio, NR, Physical Random Access Channel, PRACH, configuration for transmission of a format 3 preamble as a NR PRACH configuration for transmission of the two sequences as a NR PRACH format 0 preamble followed by a NR PRACH format 1 preamble.

8. The method of claim 1, wherein determining two random access occasions for transmission of the random access channel with two sequences comprises:
    receiving a random access parameter that indicates a random access configuration; and
    selecting two consecutive random access occasions from a set of random access occasions defined by the random access configuration as the two random access occasions for transmission of the random access channel with two sequences.

9. The method of claim 1, wherein determining two random access occasions for transmission of the random access channel with two sequences comprises:
    receiving a random access parameter that indicates a random access configuration, the random access configuration defining one or more existing random access occasions; and
    selecting the two or more random access occasions for transmission of the random access channel with two sequences from among a set of random access occasions that comprises the one or more existing random access occasions and one or more additional random access occasions that are time division multiplexed with the one or more existing random access occasions.

10. The method of claim 1, wherein the two random access occasions are concatenated in the frequency-domain.

11. A wireless communication device for random access, the wireless communication device being configured to:
    determine one or more random access occasions for transmission of a random access channel, determining the one or more random access occasions for transmission of a random access channel comprising determining the one or more random access occasions for transmission of the random access channel with two or more sequences, determining the one or more random access occasions for transmission of the random access channel with two or more sequences comprising determining two random access occasions for transmission of the random access channel with two sequences, determining two random access occasions for transmission of the random access channel with two sequences comprising receiving a random access parameter that indicates one of a plurality of defined random access configurations defined for transmission of a random access channel with two sequences and determining the two random access occasions based on the received random access parameter, the two random access occasions concatenated in the time-domain and the plurality of defined random access configurations defined for transmission of a random access channel with two sequences comprised in a table, the table a table defined for Non-Terrestrial Network, NTN, specific random access, and the random access parameter an index to the table; and transmit the random access channel on the determined one or more random access occasions, transmitting the random access channel comprising transmitting the random access channel with the two or more sequences on the determined one or more random access occasions.

12. A method performed by radio access node for configuring a wireless communication device for random access, the method comprising:

configuring the wireless communication device with one or more random access occasions for transmission of a random access channel with two or more sequences;

sending a random access parameter that indicates one of a plurality of defined random access configurations defined for transmission of a random access channel with two sequences, the plurality of defined random access configurations defined for transmission of a random access channel with two sequences comprised in a table, and the random access parameter an index to the table, the table a table defined for Non-Terrestrial Network, NTN, specific random access; and configuring the wireless device with the table.

13. The method of claim 12, further comprising receiving a random access channel with two or more sequences on the configured one or more random access occasions.

14. A radio access node for configuring a wireless communication device for random access, the radio access node configured to:

configure the wireless communication device with one or more random access occasions for transmission of a random access channel with two or more sequences;

send a random access parameter that indicates one of a plurality of defined random access configurations defined for transmission of a random access channel with two sequences, the plurality of defined random access configurations defined for transmission of a random access channel with two sequences comprised in a table, and the random access parameter an index to the table, the table a table defined for Non-Terrestrial Network, NTN, specific random access; and configure the wireless device with the table.

* * * * *